(12) United States Patent
Pope

(10) Patent No.: US 8,775,275 B1
(45) Date of Patent: Jul. 8, 2014

(54) INFERRING USER INTENT BASED ON NETWORK NAVIGATION PATHS

(75) Inventor: Elmore Eugene Pope, Sammamish, WA (US)

(73) Assignee: Amazon Technologies, Inc., Reno, NV (US)

( * ) Notice: Subject to any disclaimer, the term of this patent is extended or adjusted under 35 U.S.C. 154(b) by 401 days.

(21) Appl. No.: 13/076,237

(22) Filed: Mar. 30, 2011

(51) Int. Cl.
*G06Q 30/00* (2012.01)
*G06Q 30/06* (2012.01)
*G06Q 30/02* (2012.01)

(52) U.S. Cl.
CPC ........ *G06Q 30/0641* (2013.01); *G06Q 30/0631* (2013.01); *G06Q 30/0251* (2013.01); *G06Q 30/0255* (2013.01)
USPC .... 705/27.1; 705/26.7; 705/14.53; 705/14.49

(58) Field of Classification Search
CPC .......... G06Q 30/0631; G06Q 30/0641; G06Q 30/0251; G06Q 30/0252; G06Q 30/0253; G06Q 30/0254; G06Q 30/0255; G06Q 30/0256; G06Q 30/0257; G06Q 30/0261; G06Q 30/0267; G06Q 30/0601
USPC .................. 705/26.1, 26.7, 27.1, 14.49, 14.5, 705/14.51, 14.52, 14.53, 14.54, 14.55, 705/14.58, 14.64
See application file for complete search history.

(56) References Cited

U.S. PATENT DOCUMENTS

| | | | |
|---|---|---|---|
| 6,345,264 B1 * | 2/2002 | Breese et al. .................... 706/21 |
| 7,461,061 B2 * | 12/2008 | Aravamudan et al. ................. 1/1 |
| 7,546,262 B1 * | 6/2009 | Ferguson et al. ................ 705/35 |
| 7,571,121 B2 * | 8/2009 | Bezos et al. ................... 705/26.7 |
| 7,769,764 B2 | 8/2010 | Ramer et al. |
| 8,073,460 B1 * | 12/2011 | Scofield et al. ............ 455/456.1 |
| 8,290,810 B2 | 10/2012 | Ramer et al. |
| 8,396,759 B2 * | 3/2013 | Mehta et al. .................. 705/26.7 |
| 8,560,964 B2 * | 10/2013 | Dodson et al. ................. 715/819 |
| 8,577,732 B1 * | 11/2013 | Martin et al. ................. 705/26.1 |
| 8,620,770 B1 * | 12/2013 | Pope ............................. 705/26.7 |
| 8,655,746 B1 * | 2/2014 | Mussman et al. ............ 705/26.7 |
| 2002/0165940 A1 * | 11/2002 | Kameoka et al. ............. 709/218 |
| 2004/0027391 A1 * | 2/2004 | Tu ................................. 345/810 |
| 2005/0203807 A1 * | 9/2005 | Bezos et al. ..................... 705/26 |
| 2006/0069612 A1 * | 3/2006 | Hurt et al. ........................ 705/14 |
| 2006/0293957 A1 * | 12/2006 | Petersen et al. .................. 705/14 |
| 2007/0244750 A1 | 10/2007 | Grannan et al. |
| 2007/0288456 A1 * | 12/2007 | Aravamudan et al. ............ 707/5 |

(Continued)

OTHER PUBLICATIONS

Hye, J., "Reebok Spins Its Web; Bringing Brand Image to the Consumer Is the Interactive Goal," SportStyle, p. 33, Apr. 1998.*

(Continued)

*Primary Examiner* — Nicholas D Rosen
(74) *Attorney, Agent, or Firm* — Robert C. Kowert; Meyertons, Hood, Kivlin, Kowert & Goetzel, P.C.

(57) ABSTRACT

Paths followed by a plurality of devices are recorded. Devices of the plurality have sent content requests similar to a current content request. Behaviors exhibited by respective ones of the plurality of devices. The respective ones of the paths are grouped into intent groupings. A path followed by a device is assembled. The assembling the path comprises recording a plurality of content requests generated by the device prior to the current content request. An intent grouping matching the path is identified. The intent grouping is associated with an expected behavior. Content calculated to facilitate the expected behavior is identified.

25 Claims, 20 Drawing Sheets

(56) References Cited

U.S. PATENT DOCUMENTS

| | | | | |
|---|---|---|---|---|
| 2008/0082417 | A1* | 4/2008 | Publicover | 705/14 |
| 2008/0214151 | A1 | 9/2008 | Ramer et al. | |
| 2008/0248815 | A1* | 10/2008 | Busch | 455/456.5 |
| 2008/0288406 | A1* | 11/2008 | Seguin et al. | 705/50 |
| 2009/0017805 | A1 | 1/2009 | Sarukkai et al. | |
| 2009/0172747 | A1* | 7/2009 | Vantalon et al. | 725/61 |
| 2009/0210806 | A1* | 8/2009 | Dodson et al. | 715/760 |
| 2009/0210898 | A1* | 8/2009 | Childress et al. | 725/34 |
| 2009/0259632 | A1* | 10/2009 | Singh | 707/3 |
| 2010/0235241 | A1* | 9/2010 | Wang et al. | 705/14.66 |
| 2011/0239103 | A1* | 9/2011 | Mercuri | 715/234 |
| 2012/0078708 | A1* | 3/2012 | Taylor et al. | 705/14.41 |
| 2012/0246000 | A1* | 9/2012 | Yarvis et al. | 705/14.53 |

OTHER PUBLICATIONS

Flamberg, D., "Understanding the Empowered E-Consumer," iMarketing News, vol. 1, No. 9, p. 32, Nov. 19, 1999.*

Anon., "Tracking Carbuyers' Online Paths to Purchase Shows Their Likelihood to Buy, According to Forrester Research," Business Wire, p. 2405, Feb. 19, 2002.*

Fitzgerald, M., "Prototype: Predicting Where You'll Go and What You'll Like," New York times, Late Edition—Final Edition, col. 0, p. 4, Jun. 22, 2008.*

M.J. O'Grady, G.M.P. O'Hare, C. Sas "Mobile Agents for Mobile Tourists: A User Evaluation of Gulliver's Genie" published Feb. 25, 2005, Interacting with Computers 17 (2005) pp. 1-24.

Keith Cheverst, Nigel Davies, Keith Mitchell, Adrian Friday "Experiences of Developing and Deploying a Context-Aware Tourist Guide: The Guide Project" MOBICOM 2000 Boston, MA, pp. 1-12.

Keith Cheverst, Nigel Davies, Keith Mitchell and Paul Smith "Providing Tailored (Context-Aware) Information to City Visitors" Distributed Multimedia Research Group Lancaster, UK pp. 1-10.

U.S. Appl. No. 13/076,249, filed Mar. 30, 2011, Elmore Eugene Pope.

Notice of Allowance from U.S. Appl. No. 13/076,249, mailed Sep. 5, 2013, Elmore Eugene Pope, pp. 1-14.

* cited by examiner

INFERRING USER INTENT BASED ON NETWORK NAVIGATION PATHS

BACKGROUND OF THE INVENTION

As the reach and accessibility of computer networks such as the Internet increase, the amount of information accessible via such networks has grown exponentially. For example, as commercial enterprises increasingly embrace electronic commerce techniques, numerous websites offering information and purchasing opportunities for various products and services have appeared. Major media outlets commonly provide web-based versions of content previously available only through print or broadcast channels, and in some instances generate considerable volumes of content exclusively for web-based distribution. The reduction of cost, complexity and other barriers to entry into web-based content publishing has also facilitated the generation and dissemination of content by individual creators. This phenomenon is perhaps best illustrated by the increasing number and popularity of commercial opportunities, referred to as e-commerce, which offer the ability to sell goods, services and information online.

As the amount of online content increases, the difficulty of locating content that is of general or specific interest also increases. Unlike libraries, which may employ standardized systems of content classification such as the Library of Congress System or the Dewey Decimal System, no standard for organizing and representing web-based content exists. Numerous search engines have evolved to attempt to index web pages according to the page contents (e.g., as given by the textual content actually displayed by the page when loaded into a browser or client, or by concealed metadata such as tags associated with or embedded within the page). Such search engines have further attempted to qualify the relevance of a given indexed page using other features of the page, such as its age and/or the number of links to the given indexed page from other indexed pages. For example, for a given keyword search, a page that satisfies the search criteria and is linked to from many sources may be considered a more relevant search result than a page having fewer external references.

Figure 1:
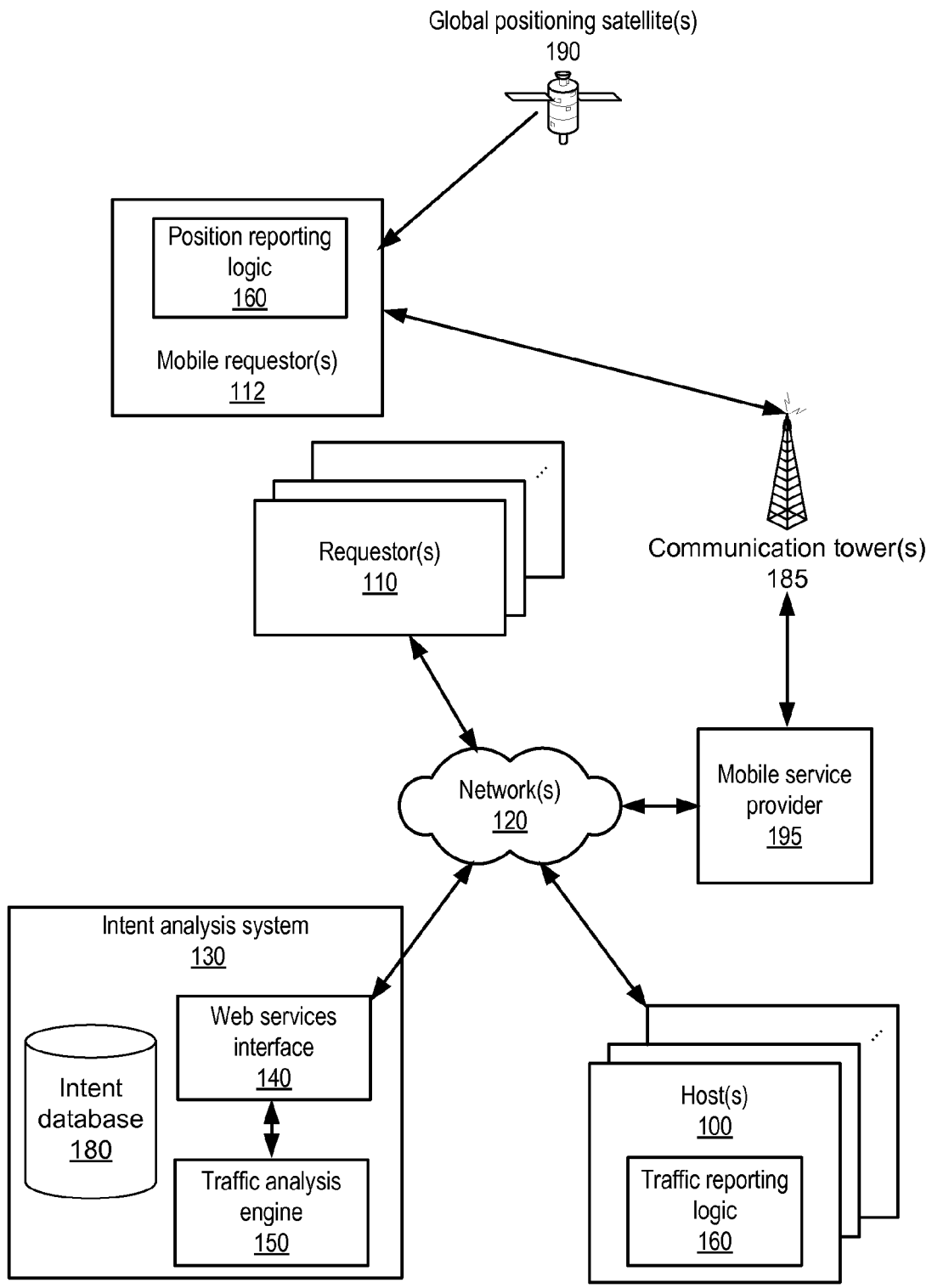
FIG. 1 depicts a logical block diagram illustrating various components of a system configured to infer user intent from one or more of network navigation paths and physical navigation paths and communicate content appropriate to an expected next behavior, according to one embodiment.

While the invention is described herein by way of example for several embodiments and illustrative drawings, those skilled in the art will recognize that the invention is not limited to the embodiments or drawings described. It should be understood, that the drawings and detailed description thereto are not intended to limit the invention to the particular form disclosed, but on the contrary, the intention is to cover all modifications, equivalents and alternatives falling within the spirit and scope of the present invention as defined by the appended claims. Any headings used herein are for organizational purposes only and are not meant to limit the scope of the description or the claims. As used herein, the word "may"

is used in a permissive sense (i.e., meaning having the potential to), rather than the mandatory sense (i.e., meaning must). Similarly, the words "include", "including", and "includes" mean including, but not limited to.

DETAILED DESCRIPTION OF EMBODIMENTS

Comparison of the path followed by a current user to previous paths followed by previous users allows embodiments to facilitate the formation of inferences with respect to an intent of the current user. By inferring user intent, embodiments allow for the selection of content designed to facilitate the inferred intent or expected behaviors associated with the inferred intent and for the provision of that content to the user. In some embodiments, the path followed by a device associated with the current user and the paths followed by devices associated with previous users include network navigation information reflecting requests for content received from the device associated with the current user and the devices associated with the previous users, respectively. In some embodiments, the path followed by a device associated with the current user and the paths followed by devices associated with previous users include physical navigation information reflecting location data received with respect to the device associated with the current user and the devices associated with the previous users, respectively. In some embodiments, the path followed by a device associated with the current user and the paths followed by devices associated with previous users include both network navigation information and physical navigation information with respect to the device associated with the current user and the devices associated with the previous users, respectively.

In some embodiments, path information is coupled to contextual information, called contextual flags, to offer enhanced inferences with respect to user intent. Examples of context flags include information such as the recency or staleness of paths and behavior, which allow embodiments to give higher amounts of weight to recently followed paths. Other examples of contextual flags include enhanced weightings of paths or behaviors that are repeated by one or multiple users, or decreased weightings of paths that fail to reliably predict an expected behavior. As another example of contextual flags, if a group of paths include a particular location, a geographic information system (GIS) context data store is consulted to ascertain activities occurring at that location to enhance the quality of inferences with respect to user intent that are generated. As a further example, if a group of paths include a particular content source on a network, the content of the network data source is reviewed to ascertain activities associated with that content data source to enhance the quality of inferences with respect to user intent that are generated, as discussed below.

One embodiment of a system configured to facilitate the distribution of online content is illustrated in FIG. 1. FIG. 1 depicts a logical block diagram illustrating various components of a system configured to infer user intent from one or more of network navigation paths and physical navigation paths and communicate advertising content appropriate to an expected behavior associated with an intent group composed of such paths, according to one embodiment. In the illustrated embodiment, a number of hosts 100 are configured to receive requests for online content from a number of content requestors 110 via a network 120. Additionally, an intent analysis (IA) system 130 including a web services (WS) interface 140 and a traffic analysis (TA) engine 150 is configured to communicate with hosts 100 via network 120. As noted below in conjunction with the description of FIG. 13, in some embodiments some or all of the components illustrated in FIG. 1 may be partially or entirely implemented as computer-executable instructions and data stored via a computer-accessible medium.

Generally speaking, hosts 100 may be instances of online content sources, where a content source may encompass any suitable type of data that may be conveyed over a network, including but not limited to text documents, still image data, audio data, video data, metadata such as markup language tags, communication protocol data such as content preambles/epilogues, and so forth. In many embodiments, hosts 100 may be configured to provide online content to requestors 110 via web-based data request and transport protocols. For example, hosts 100 may be configured to host web sites implementing Uniform Resource Locators (URLs) corresponding to web pages, documents or other online content, and to receive requests for access to particular URLs formatted in a version of the Hypertext Transport Protocol (HTTP) data transport protocol. In response to such requests, hosts 100 may be configured to access the content corresponding to the requested URL and to provide it to the requestor 110 in accordance with the HTTP protocol. It is contemplated that in some embodiments, application layer data transport protocols other than or in addition to HTTP may be used to convey requests for content and the resulting content to and from hosts 100. For example, a secure, authenticated version of HTTP may be employed, as may a version of File Transfer Protocol (FTP) or any other suitable protocol.

In some embodiments, a given host 100 may be configured as a self-contained, standalone web server that both stores online content and receives and processes requests for stored content. In other embodiments, a given host 100 may be included within a complex content server architecture. For example, host 100 may be configured as an application or content server that does not actually store content, but is instead configured to retrieve requested content from a database or other repository (not shown) that may not be directly connected to network 120.

Network(s) 120 may include any suitable data network or combination of networks configured for communicating content requests and content between traffic pattern analysis system 100 and mobile service provider 195. For example, network 120 may include one or more Local Area Networks (LANs) such as Ethernet networks, as well as Wide Area Networks (WANs), Metropolitan Area Networks (MANs), or other data or telecommunication networks implemented over any suitable medium, such as electrical or optical cable, or via any suitable wireless standard such as IEEE 802.11 ("Wi-Fi"), IEEE 802.16 ("WiMax"), etc. In various embodiments, all or a portion of network 120 may encompass the network infrastructure commonly referred to as the Internet. In other embodiments, network 120 may be entirely contained within an enterprise and not directly accessible from the Internet.

Content requestors 110 in general may encompass any device, system or software application that may be configured to request online content. For example, a requestor 110 may include a general purpose computing system configured to implement a web browser such as a version of Microsoft™ Internet Explorer™, Firefox, Opera™, or another suitable web browser or client application, as is described below with respect to FIG. 6B. Requestor 110 may also include functionality defined by scripts, such as JavaScript modules, configured to execute in a standalone environment or an execution environment provided by a web browser. Requestor 110 may alternatively be configured to host a syndicated content aggregator that may use a publish/subscribe protocol such as RSS to notify users of the existence of new or updated online content. In some embodiments, mobile requestors 112 may include mobile devices, such as cellular phone or wireless devices configured to request online content via embedded clients, as is described below with respect to FIG. 7. A requestor 110 may further encompass other types of network-attached devices such as television set-top boxes, digital video recorders, etc.

While online content hosted by hosts 100 may often conform to a web-based model in which content may be requested via URLs and delivered to a web browser or other web client, this is not a requirement for the methods and techniques described below. Broadly speaking, hosts 100 may host any type of online content and may interact with requestors 110 according to any suitable request/response model to provide the hosted content. For example, in some embodiments, hosts 100 may be configured as databases, file systems, or other types of data repositories accessible by protocols other than web-based protocols.

Content Request Traffic Data Collection

As described above, a host 100 may receive content request traffic from various requestors 110 that is directed to online content hosted by host 100. For example, a host 100 may receive HTTP GET requests directed to a particular URL, or a different type of content request according to a different data transport protocol. In the illustrated embodiment, hosts 100 may be instrumented with traffic reporting logic 160, which in various embodiments may include scripts, code or hardwired logic configured to report content request traffic to interest analysis system 130, including information identifying particular devices, such as individual ones or groups of requestors 110 or mobile requestors 112, to particular content requests.

In one embodiment, traffic reporting logic 160 may be configured to invoke one or more web services (WS) calls targeting the WS interface 140 of IA system 130 as the service endpoint, and network traffic information, such as content requests, can be stored in an intent database 180. One embodiment of such an intent database 180 is discussed below with respect to FIG. 2. In one embodiment host 100 may detect an incoming HTTP GET request specifying a given URL. In response, IA system 130 may be notified of the content request traffic via a web services call and the reported request traffic may be stored in intent database 180. For example, traffic reporting logic 160 may be configured to issue a web services call according to the following format:

http://<endpoint>/xml?Operation=recordpath
&Url=<valid URL>
&Referrer1=<valid referrer URL>
&Referrer2=<valid referrer URL>
&Location=<location data>
&ResponseType=<valid response type> where <endpoint> corresponds to the Internet address of WS interface 140, in name or numeric form, and where <valid URL> denotes the requested or targeted URL hosted by one of hosts 100. In the illustrated embodiment, two referrer URLs may also be supplied. A location of the referring device is also supplied, though one of skill in the art will readily realize, in light of having read the present disclosure, that various components of the example web services call may be omitted, others may be substituted, and still others may be supplied without deviating from the scope and intent of the present disclosure. The indicated <location data> may include time stamps, latitude and longitude, or proximity other location information that will vary between embodiments. The first referrer URL may correspond to the URL from which the request for the targeted URL originated. For example, the request may have been generated by a user selecting (e.g., clicking) a link or otherwise executing a navigation operation on some other web page, in which case the first referrer URL may include the URL of that other web page. Similarly, the second referrer URL may include the URL of the site, page or other resource that referred to the first referrer URL (e.g., the URL that is two links previous to the targeted URL in the navigation history of the requestor). More or fewer referrers may be provided in various embodiments. Also, additional or different parameters may be used in the web services call in various embodiments. For example, date and/or time information associated with the occurrence of the content request may be embedded within the web services call used to report the content request. Alternatively, such information may be recorded by IA system 130 when it receives such a report. In one embodiment, the current content request and the referrers form a navigation path comprising a plurality of URLs requested by the user prior to requesting a URL of a requested page are supplied in a single data structure when executing a web services call.

It is noted that in some embodiments, when a user navigates away from content on a particular host 100 to a different content source (e.g., a URL hosted by a different host 100), the particular host 100 may be configured to detect the outgoing transition. In some such embodiments, hosts 100 may be configured to report such outgoing content request traffic via traffic reporting logic 160 in addition to incoming content request traffic. Since navigation away from one content source typically implies navigation towards another, even if the target host is not instrumented to report content request traffic data (e.g., with an instance of traffic reporting logic 160), in some circumstances content request traffic data may still be captured by the host that is navigated away from.

Location Information Collection

In addition to paths based on network traffic, some embodiments of intent analysis system 130 are equipped to ascertain paths including location information or paths based on both location information and network traffic, as described below. In such embodiments, an intent of a mobile requestor 112 may be inferred based on a navigation path including physical locations of mobile requestor 112 as well as, in some embodiments, a content request traffic pattern, current location, and in some embodiments, demographic information regarding a user of mobile requestor 112.

Physical navigation path or traffic pattern information regarding mobile device user navigation between and among physical locations, such as among various stores in a shopping mall, may be analyzed to determine navigation paths between and among the locations. Such paths may be used to infer intent that is used as an aid in various types of advertising decisions, such as directing electronic advertising or coupons for a behavior associated with various paths that are statistically comparable to the path of the mobile device user, thus facilitating the expected behavior. Mobile device users' navigation paths such as the order in which users navigate among stores in a shopping mall, venders in flea market or rides in an amusement park, may be collected and may be aggregated over time to infer user intent and, from the inferred intent, recommend content appropriate to the inferred intent.

Positional information regarding the current location of a mobile device user may be obtained in any of various manners, according to various embodiments. For example, mobile devices are increasingly required to provide Global Positioning Information, such as to support 911 and other emergency services. Thus, mobile requestor 112 may determine its current location using position reporting logic 160 applied to signals from Global Positioning Satellites 190 and transmit its current location to a mobile service provider 195. Such transmission is, in some embodiments, accomplished via the normal wireless communication of the mobile device, for example via a network of communication towers 185, such as mobile, cellular and/or satellite communication towers. Thus, in some embodiments, the location of a mobile device user may be tracked via GPS data provided by the device itself for assembly into a path by intent analysis system 130. In various embodiments, mobile requestor 112 may represent a mobile (e.g., cellular) phone, a GPS navigation device (either handheld or vehicle installed), pager, or generally any wireless device, such as a PDA or other handheld computer, that can be tracked positionally and treated as a requestor for the purposes of predicting intent and providing intent-dependent advertising.

Alternatively, the location of a mobile device user may be determined by cell-signal triangulation by mobile service provider 195. As radio, wireless and cellular signal triangulation is well understood in the art, the details thereof will not be discussed herein. In general, any method of determining the location of mobile device user may be used to provide mobile device path navigation data for analysis as described herein.

Mobile service provider 195 may provide a service of distributing mobile device user's locations via any of various means, such as via a web-based interface over network 120, according to different embodiments. In some embodiments, the mobile device user may have signed up or agreed to have his/her movements and content requests tracked and to have information regarding resulting paths analyzed and included in data utilized by intent analysis system 130 to infer user intent and to suggest and/or recommend content designed to facilitate expected behaviors. For instance, a mobile device user's service contract with mobile service provider 195 may include language giving mobile service provider 195 permission to track the user's movements and content requests and/or to provide positional information regarding the user's movements and content requests to third parties, such as to intent analysis system 130 for path analysis, intent grouping, intent-dependent advertising, predicting and or recommending behavior and providing appropriate content.

An in-vehicle navigational device may act as a mobile requestor 112 and may also include (either as installed or via an update) aggregated navigational trail information and the navigational device may be configured to analyze the vehicles movement according to the navigational information to recommend destinations and/or to provide advertising content for destinations, as described herein.

Additionally, in some embodiments, a user of a requestor 110 or mobile requestor 112 may be able to turn on and off the reporting of positional information and content requests as desired and to turn on or off the receipt of any intent-dependent advertising and content communications. In yet other embodiments, a user of a requestor 110 or mobile requestor 112 may allow positional and network navigation information regarding his/her movements and content requests to be tracked, provided to third parties and used in traffic pattern analysis, path-dependent advertising, predicting and recommending destinations while also opting out of receiving any intent-dependent content, coupons, or recommended transactions.

In some embodiments, intent analysis system 130 may be configured to communicate with mobile server provider 195 over network 120 to obtain the location of mobile requestors 112 and to communicate with hosts 100 to obtain content requests of requestors 110 and mobile requestors 112. In other embodiments, mobile service provider 195 or host 100 may be configured to expose an application programming interface (API) or other protocol for providing positional and content request information regarding requestors 110 and mobile requestors 112.

In some embodiments, intent analysis system 130 may be configured to obtain (or receive) location and content request information regarding mobile device users from different mobile service providers 195. Intent analysis system 100 may be configured to store the location and content request information in intent database 180 for current or future analysis. For example, intent analysis system 100 may be configured to continuously receive and analyze positional and content request information regarding many different requestors over the course of days, weeks, months or even years to build path data structures comprising location and content request as well as related behavior, and to group the path data structures into intent groupings. These paths, once stored, may be compared to a current path for inferring intent and providing content appropriate to that intent. Intent analysis system 130 may store the individual path data structures in any suitable database format.

Inferring Intent from Path Data

Figure 2:
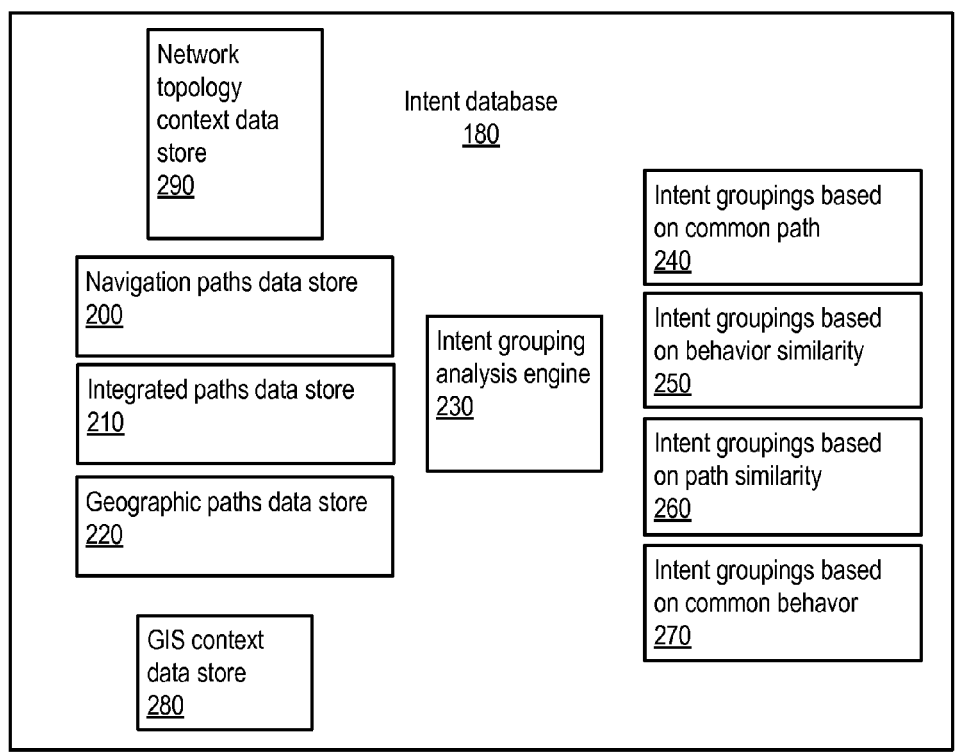
FIG. 2 illustrates an intent database configured to group users into intent groupings according to one embodiment.

FIG. 2 illustrates an intent database configured to group users into intent groupings according to one embodiment. In one embodiment, intent database contains an intent grouping analysis engine 230 for recording paths followed by a plurality of devices and recording with the respective path data behaviors exhibited by respective ones of the plurality of devices. In one embodiment, intent database generates path groupings for inferring user intent by comparing paths and behavior of users and grouping paths according to path similarity or behavior similarity.

In some embodiments, after a device requests content or is identified at a particular location, intent database 180 may be consulted to infer the intent of the user of the device. Such an inference of intent may be constructed by identifying intent groupings containing paths of content requests specifying content similar to content that is specified in a path containing a current content request and/or previous content requests of the current device. Such an inference of intent may alternatively be constructed by identifying intent groupings containing paths of locations similar to locations specified in a path containing a current location and/or previous locations of the current device. Paths are recorded to path data stores such as a navigation paths data store 200 for recording paths storing histories of network navigation requests by various devices and associated behavior information, a physical paths data store 220 for recording paths storing histories of the physical locations of various devices and associated behavior information and an integrated paths data store 210 for storing histories of content requests by and physical locations of various devices and associated behavior information. Additionally, a network topology context data store 290 is used to store information relating to the content of sites that are the object of content requests, and a GIS context data store 280 is used to store information characterizing various physical locations or otherwise relating to activities that may be performed at various physical locations.

Intent grouping analysis engine 230 is further configured to group the respective ones of the plurality of users into intent groupings based on comparison of respective ones of the behaviors. Likewise, intent grouping analysis engine 230 is further configured to compare a navigation path (network or physical) to the paths in data stores 200-220 to identify an intent grouping matching a navigation path. Intent grouping analysis engine 230 may create intent groupings based on common content requests or physical locations and store these groupings in intent groupings based on common path 240. Intent grouping analysis engine 230 may create intent groupings based on behavior similarity and store these groupings in intent groupings based on behavior similarity 250. Intent grouping analysis engine 230 may create intent groupings based on similar content requests or physical location, and store these groupings in intent groupings based on path similarity 260. Determinations with respect to path similarity can be made by consulting one or both of GIS context data store 280 and network topology context data store 290 for comparisons of the attributes of individual path entries. Intent grouping analysis engine 230 may create intent groupings based on common behavior and store these groupings in intent groupings based on common behavior 270.

Embodiments vary with respect to the particular implementations used to determine common intent groupings without departing from the scope and intent of the present disclosure. For example, some embodiments generate intent groupings by comparing statistical measures of path similarity. Examples of statistical measures of path similarity vary. In one embodiment, statistical measures of path similarity are determined by calculating a number or percentage of common content requests or common locations visited along a path. Alternatively, statistical measures of path similarity are determined by calculating a number or percentage of "similar" content requests or "similar" locations visited along a path.

In some embodiments, content requests are determined to be similar on the basis of keyword analysis (e.g., number or percentage of shared keywords in content or metadatata) of sites hosting requested items of content or of the content returned responsive to the content requests themselves. For example, different users visiting two websites that host advertisements for the same type of content, such as mobile phone applications, are detected by some embodiments, either through direct analysis of the content or through extraction of information from network topology context data store 290, and the degree of similarity (e.g. number or percentage of shared keywords in content or metadatata) is used to numerically score the similarity of the sites.

Likewise, in some embodiments, locations will be determined to be similar on the basis of analysis of data in GIS context data store 280 (e.g. number or percentage of shared keywords associated with a location in GIS context data store 280) associated with sites visited by users. For example, different visiting two locations indicated by GIS context data store 280 to sell mobile the same type of products, such as mobile computing devices, is detected by some embodiments, either through direct analysis of GIS context data store 280 or through extraction of information from behaviors stored in one of paths data stores 200-220. Example of such behaviors include purchase transactions.

In some embodiments, intent grouping analysis engine 230 may further embody a content analysis module that is further configured identify content appropriate to a group behavior associated with the intent grouping, or this function may be performed by traffic analysis engine 150 or by hosts 100.

Further, as noted below with respect to FIGS. 3-5, order in which sites are visited may be used to determine path similarity. The percentage of common ordering is used by some embodiments to determine path similarity.

Path Data Structures

Figure 3:
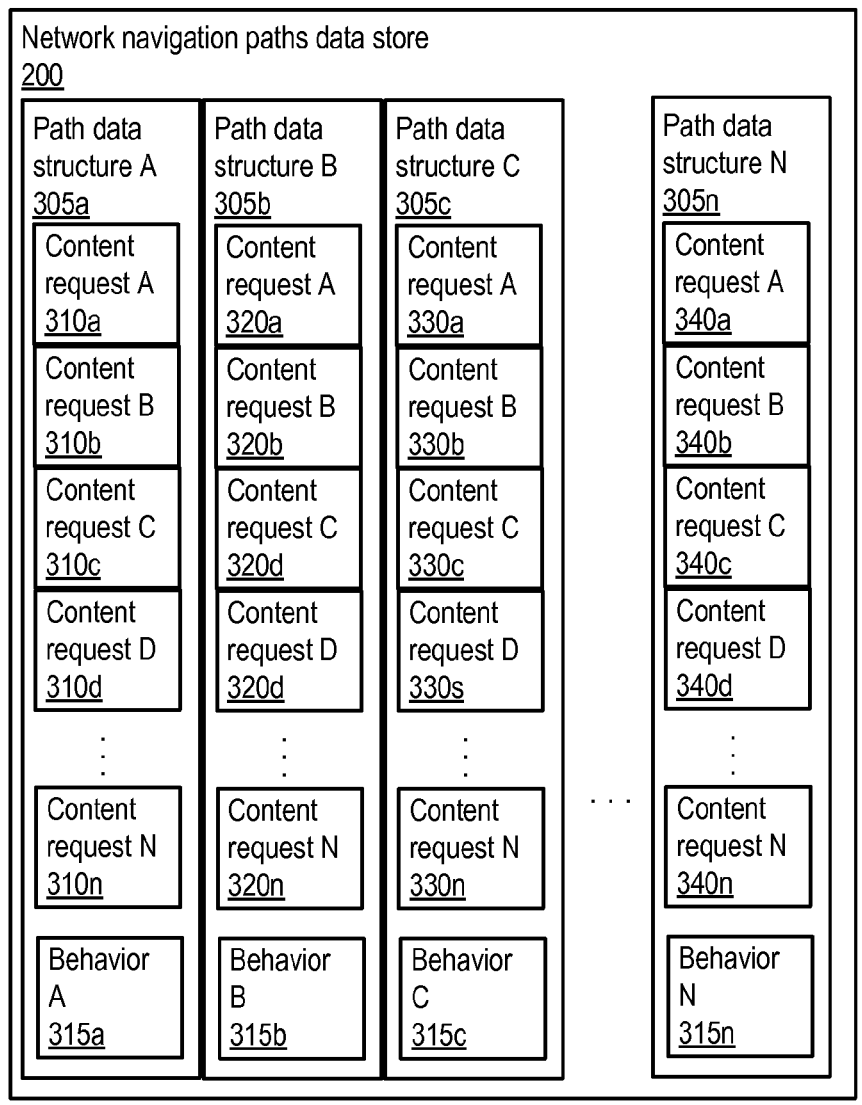
FIG. 3 depicts one embodiment of a network navigation paths data store configured to store data regarding network navigation paths of devices, as well as recordings of behavior.

FIG. 3 depicts one embodiment of a network navigation paths data store configured to store data regarding network navigation paths of devices, as well as recordings of behavior. A network navigation paths data store 200 includes information related to content requests from a group of devices. A set of path data structures 305a-305n stores information about content requests and behavior exhibited by devices. For example, path data structure A 305a includes a series of content requests 310a-310n and a behavior A 315a. For example, path data structure A 305a includes a series of content requests 310a-310n and a behavior A 315a. Path data structure B 305b includes a series of content requests 320a-320n and a behavior A 315b. Path data structure C 305c includes a series of content requests 330a-330n and a behavior C 315c. Path data structure N 305n includes a series of content requests 340a-340n and a behavior C 315n.

In some embodiments, each of content requests 310a-310n, content requests 320a-320n, content requests 330a-330n and content requests 340a-340n contains a record of a content request. In some embodiments, a content request is an HTTP GET request specifying a given URL, as discussed above. Other embodiments will include other requests for content. Examples of other requests may include text messages sending a content request in an SMS interface or database queries, as described above. In embodiments for which a content request is an HTTP GET request specifying a given URL, referring URLs in a trail of arbitrary depth may also be recorded in each of content requests 310a-310n, content requests 320a-320n, content requests 330a-330n and content requests 340a-340n. Also, additional or different parameters may be used in each of content requests 310a-310n, content requests 320a-320n, content requests 330a-330n and content requests 340a-340n in various embodiments. For example, date and/or time information associated with the occurrence of the content request may be embedded within each of content requests 310a-310n, content requests 320a-320n, content requests 330a-330n and content requests 340a-340n.

Behaviors 315a-315n may represent any behavior of interest to a user of an interest analysis system. In some embodiments, behaviors 315a-315n will contain a record of a content request similar to those of each of content requests 310a-310n, content requests 320a-320n, content requests 330a-330n and content requests 340a-340n.

In alternative embodiments, behaviors 315a-315n will contain records of purchase transactions. Alternatively, behaviors 315a-315n may contain geographic coordinates visited by respective ones of devices associated with path data structures 305a-305n.

Paths may be determined with respect to individual content requests pointed to individual content sources in a particular order or, it is contemplated that similar techniques may be applied to network navigation paths without regard to order among various content sources. For example, one requestor 110 may generate content requests directed to a set of content sources A, B and C in that order, while another requestor 110 may generate content requests to these sources in the order B, A, C. Some embodiments will regard a BAC path as equivalent to an ABC path, while other embodiments will ascertain that these paths are distinct. In some embodiments, such navigation paths may be detected through an analysis of the referral and destination information submitted to IA system 130 in a report of a content access request. For example, in one embodiment, IA system 130 may be configured to detect longer paths by examining reported traffic for instances in which a destination-first referrer combination of one report matches a first referrer-second referrer combination of another report, or vice versa.

Figure 4:
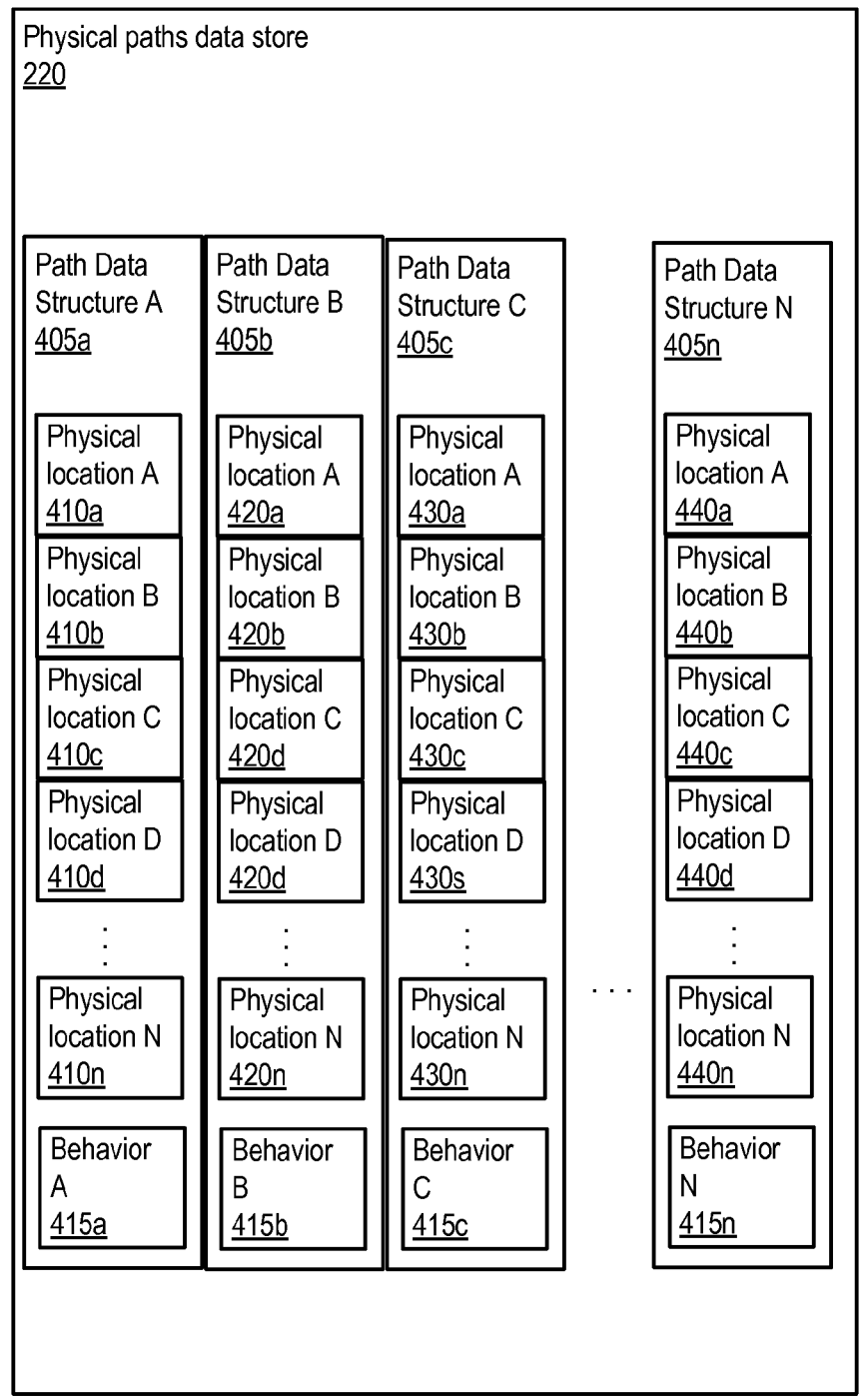
FIG. 4 illustrates one embodiment of a physical paths data store configured to store data regarding physical movement paths of devices, as well as recordings of behavior.

FIG. 4 illustrates one embodiment of a physical paths data store configured to store data regarding physical movement paths of devices, as well as recordings of behavior. A physical paths data store 220 includes information related to geographic location information provided by a group of devices.

A set of path data structures 405a-405n stores information about locations of the devices as at particular points in time. For example, path data structure A 405a includes a series of physical locations 410a-410n and a behavior A 415a. For example, path data structure A 405a includes a series of physical locations 410a-410n and a behavior A 415a. Path data structure B 405b includes a series of physical locations 420a-420n and a behavior A 415b. Path data structure C 405c includes a series of physical locations 430a-430n and a behavior C 415c. Path data structure N 405n includes a series of physical locations 440a-440n and a behavior C 415n.

In some embodiments, each of physical locations 410a-410n, physical locations 420a-420n, physical locations 430a-430n and physical locations 440a-440n contains a record of location data received from a device. In some embodiments, a device may report its current location using signals from Global Positioning Satellites and transmit its current location to a mobile service provider, which can report the position in longitude and latitude, as described above. Alternatively, the location of a mobile device user may be determined by signal triangulation by a mobile service provider and a position may be defined in a customized system of relative coordinates (e.g., with respect to cell towers or wireless routers or an alternative tracking system with respect to landmarks, such as amusement attractions or stores in a mall). Also, additional or different parameters may be recorded in each of physical locations 410a-410n, physical locations 420a-420n, physical locations 430a-430n and physical locations 440a-440n in various embodiments. For example, date and/or time information associated with the presence of the device at each physical location may be embedded within each of physical locations 410a-410n, physical locations 420a-420n, physical locations 430a-430n and physical locations 440a-440n. Likewise, velocity and direction of movement information associated with the presence of the device at each physical location may be embedded within each of physical locations 410a-410n, physical locations 420a-420n, physical locations 430a-430n and physical locations 440a-440n. In some embodiments, the proximity of other devices associated with the presence of the device at each physical location may be embedded within each of physical locations 410a-410n, physical locations 420a-420n, physical locations 430a-430n and physical locations 440a-440n.

Behaviors 415a-415n may represent any behavior of interest to a user of an interest analysis system. In some embodiments, behaviors 415a-415n will contain a record of a content request similar to those of each of content requests 310a-310n, content requests 320a-320n, content requests 330a-330n and content requests 340a-340n of FIG. 3, described above. In alternative embodiments, behaviors 315a-315n will contain records of purchase transactions. Alternatively, behaviors 315a-315n may contain geographic coordinates visited by respective ones of devices associated with path data structures 405a-405n.

Paths may be determined with respect to individual sites visited in a particular order or, it is contemplated that similar techniques may be applied to paths without regard to order among locations. For example, one requestor 110 may visit locations A, B and C in that order, while another requestor 110 may visit these locations in the order B, A, C. Some embodiments will treat paths as representing a different path and some embodiments will be agnostic to the order in which sites are visited. Likewise, other information, such as direction and velocity of travel, may also be used for path comparison.

Figure 5:
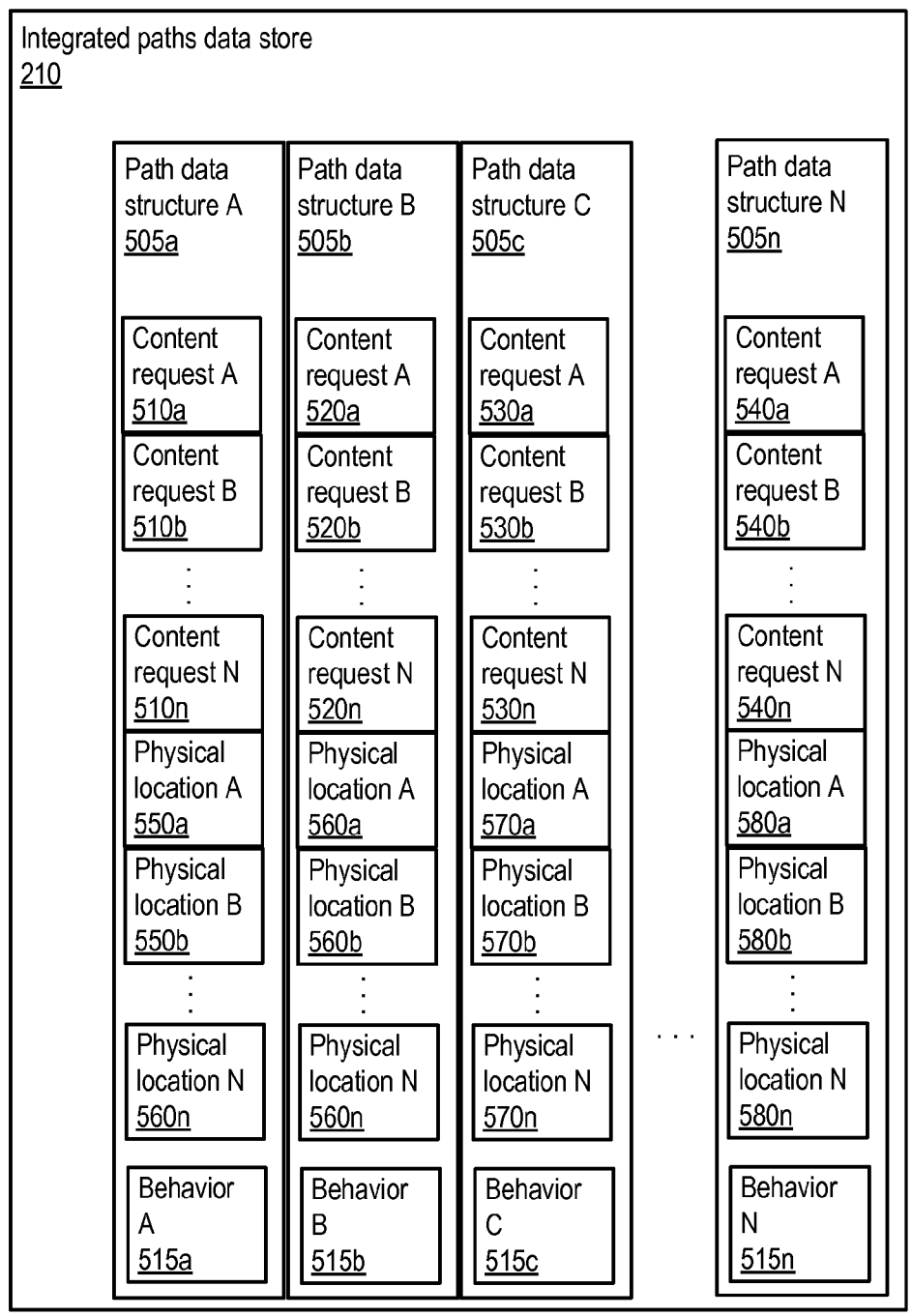
FIG. 5 depicts one embodiment of an integrated paths data store configured to store data regarding physical movement paths and network navigation paths of devices, as well as recordings of behavior.

FIG. 5 depicts one embodiment of an integrated paths data store configured to store data regarding physical movement paths and network navigation paths of devices, as well as recordings of behavior. An integrated paths data store 210 includes information related to content requests from a group of devices as well as physical locations of the devices. A set of path data structures 505a-505n stores information about content requests, physical locations and behavior exhibited by devices. For example, path data structure A 505a includes a series of content requests 510a-510n, a set of physical locations 550a-550n, and a behavior A 515a. Path data structure B 505b includes a series of content requests 520a-520n, a set of physical locations 560a-560n, and a behavior B 515b. Path data structure C 505c includes a series of content requests 530a-530n, a series of physical locations 570a-570n and a behavior C 515c. Path data structure N 505n includes a series of content requests 540a-540n, a series of physical locations 580a-580n and a behavior C 515n.

In some embodiments, each of content requests 510a-510n, content requests 520a-520n, content requests 530a-530n and content requests 540a-540n contains a record of a content request. In some embodiments, a content request is an HTTP GET request specifying a given URL, as discussed above. Other embodiments will include other forms of requests for content. Examples of other requests may include text messages sending a content request in an SMS interface or a database query in a database-based system. In embodiments for which a content request is an HTTP GET request specifying a given URL, referring URLs in a trail of arbitrary depth may also be recorded in each of content requests 510a-510n, content requests 520a-520n, content requests 530a-530n and content requests 540a-540n. Also, additional or different parameters may be used in each of content requests 510a-510n, content requests 520a-520n, content requests 530a-530n and content requests 540a-540n in various embodiments. For example, date and/or time information associated with the occurrence of the content request may be embedded within each of content requests 510a-510n, content requests 520a-520n, content requests 530a-530n and content requests 540a-540n.

Behaviors 515a-515n may represent any behavior of interest to a user of an interest analysis system. In some embodiments, behaviors 515a-515n will contain a record of a content request similar to those of each of content requests 510a-510n, content requests 520a-520n, content requests 530a-530n and content requests 540a-540n. In alternative embodiments, behaviors 515a-515n will contain records of purchase transactions. Alternatively, behaviors 515a-515n may contain geographic coordinates visited by respective ones of devices associated with path data structures 505a-505n.

Further, path data structure A 505a includes a series of physical locations 550a-550n. Path data structure B 505b includes a series of physical locations 560a-560n. Path data structure C 505c includes a series of physical locations 570a-570n. Path data structure N 505n includes a series of physical locations 580a-580n.

In some embodiments, each of physical locations 550a-550n, physical locations 560a-560n, physical locations 570a-570n and physical locations 580a-580n contains a record of location data received from a device. In some embodiments, a device may report its current location using signals from Global Positioning Satellites and transmit its current location to a mobile service provider, which can report the position in longitude and latitude, as described above. Alternatively, the location of a mobile device user may be determined by signal triangulation by mobile service provider and a position may be defined in a customized system of relative coordinates (e.g., with respect to cell towers or wireless routers or an alternative tracking system with respect to landmarks, such as amusement attractions or stores in a mall).

Also, additional or different parameters may be used in each of physical locations 550*a*-550*n*, physical locations 560*a*-560*n*, physical locations 570*a*-570*n* and physical locations 580*a*-580*n* in various embodiments. For example, date and/or time information associated with the presence of the device at each physical location may be embedded within each of physical locations 550*a*-550*n*, physical locations 560*a*-560*n*, physical locations 570*a*-570*n* and physical locations 580*a*-580*n*. Likewise, velocity and direction of movement information associated with the presence of the device at each physical location may be embedded within each of physical locations 550*a*-550*n*, physical locations 560*a*-560*n*, physical locations 570*a*-570*n* and physical locations 580*a*-580*n*. In some embodiments, the proximity of other devices associated with the presence of the device at each physical location may be embedded within each of physical locations 550*a*-550*n*, physical locations 560*a*-560*n*, physical locations 570*a*-570*n* and physical locations 580*a*-580*n*.

Paths may be determined with respect to individual content requests or locations in a particular order or, it is contemplated that similar techniques may be applied to paths without regard to order among various content sources. For example, one requestor 110 may generate content access requests directed to a set of content sources A, B and C and visits to location coordinates X, Y and Z in the order X, A, B, Y, Z, C, while another requestor 110 may generate content access requests to these sources and visits to these locations in the order B, Y, Z, A, C, X. In some embodiments, such paths may be detected through an analysis of location, referral and destination information submitted to IA system 130 in a report of a content access request. For example, in one embodiment, IA system 130 may be configured to include location information for a mobile device in the content request itself, as described above. Such location information may alternatively be attached to a content request by a mobile services provider handling the request as an intermediary. Likewise, other information, such as direction and velocity of travel, may also be used for path comparison.

Interfaces for Presenting Content Placed on the Basis of Inferred Intent

Figure 6A:
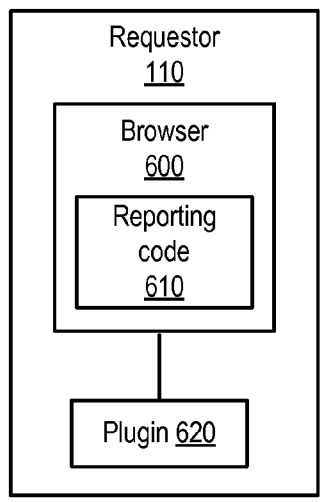
FIG. 6A illustrates a block diagram of one embodiment of a requestor configured to record data regarding physical movement paths and network navigation paths of devices, as well as indications of behavior.

FIG. 6A illustrates a block diagram of one embodiment of a requestor configured record data regarding physical movement data and network navigation data from devices, as well as indications of behavior. In one embodiment, a requestor 110 is a computer system such as the computer system described below with respect to FIG. 13. In another embodiment, a requestor is a mobile device, such as mobile requestor 112 described above with respect to FIG. 1. In one embodiment, requestor 110 hosts a browser 600, which includes reporting code 610. In some embodiments, reporting code 610 is embodied as a direct component of browser 600. Alternatively, reporting code 610 may be embodied as a plugin 620 to browser 600. Functions of reporting code 610 will vary between embodiments without departing from the scope of the present disclosure. In one embodiment, reporting code 610 tracks content requests and prepares referral information for reporting by inclusion in HTTP GET requests sent by browser 600. In some embodiments, reporting code 610 tracks content requests and prepares content request reports for transmission to an intent database, such as intent database 180 described above with respect to FIGS. 1-2. Such reporting will, in some embodiments, be performed separate from transmission of content requests to a content provider. Likewise, in one embodiment, reporting code 610 tracks location data and prepares location data for reporting for inclusion in HTTP get requests sent by browser 600, as described above. In some embodiments, reporting code 610 tracks location data and prepares location reports for transmission to an intent database, such as intent database 180 described above with respect to FIGS. 1-2. Such reporting will, in some embodiments, be performed separate from transmission of content requests. In some embodiments, content requests are further packaged with behavior information, such as time spent viewing a piece of content, or information on cursor movements.

Figure 6B:
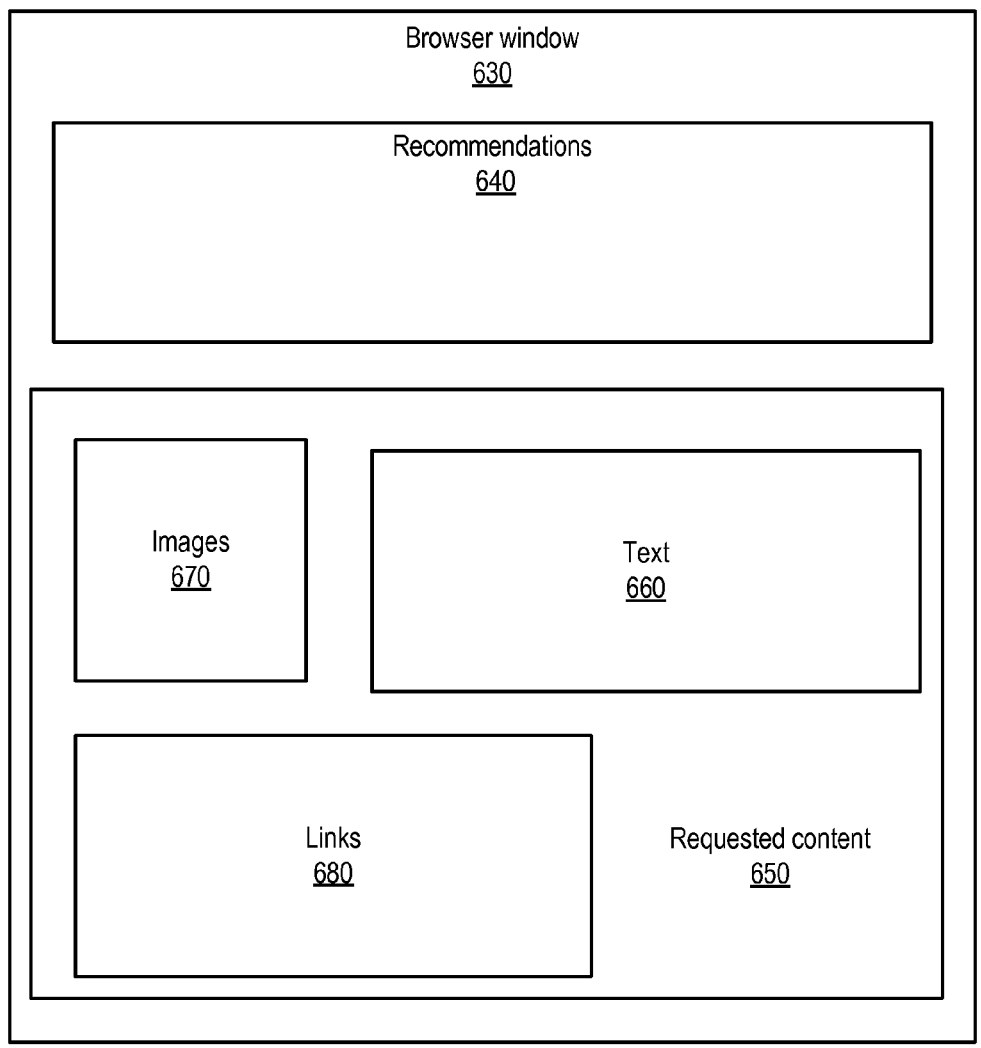
FIG. 6B depicts a block diagram illustrating one embodiment of a requestor configured display content selected as being appropriate to an expected behavior based on an intent inferred from a user path, according to one embodiment.

FIG. 6B depicts a block diagram illustrating one embodiment of a requestor configured display content selected as being appropriate to an expected behavior based on an intent inferred from a user path, according to one embodiment. In one embodiment, a browser window 630 includes a set of recommendations 640 as well as requested content 650. Requested content includes text 660, images 670, and links 680. Embodiments facilitate a system in which user intent is inferred from paths consisting of either or both of content requests and physical locations. Based on the inferred user intent, content is selected for delivery to a device, such as a requestor 110 of FIG. 6A, for display in browser window 630. In some embodiments, content selected for delivery on the basis of inferred user intent is displayed as recommendations 640. Examples of such recommendations may include recommending products for purchase by a user of the device displaying browser window 630, which may be generated by a recommendation generation engine that is, in some embodiments, provided as part of the traffic analysis engine 150 described above with respect to FIG. 1.

In some embodiments, content in either requested content or recommendations can be either selected for transmission or ordered for display in an order reflecting a measure of appropriateness to the group behavior associated with the intent grouping. In some embodiments content selected for delivery on the basis of inferred user intent is displayed as requested content 650. Requested content, can, in some embodiments, include content recommending products for purchase by a user of the device displaying browser window 630 (e.g., in an e-commerce application of browser window 630). Likewise, requested content 650 can include text 660, images 670, and links 680 not explicitly requested by a user of browser window 630 but inferred to be applicable to the intent determined from the physical location or content navigation paths demonstrated by a user of browser window 630.

Figure 7:
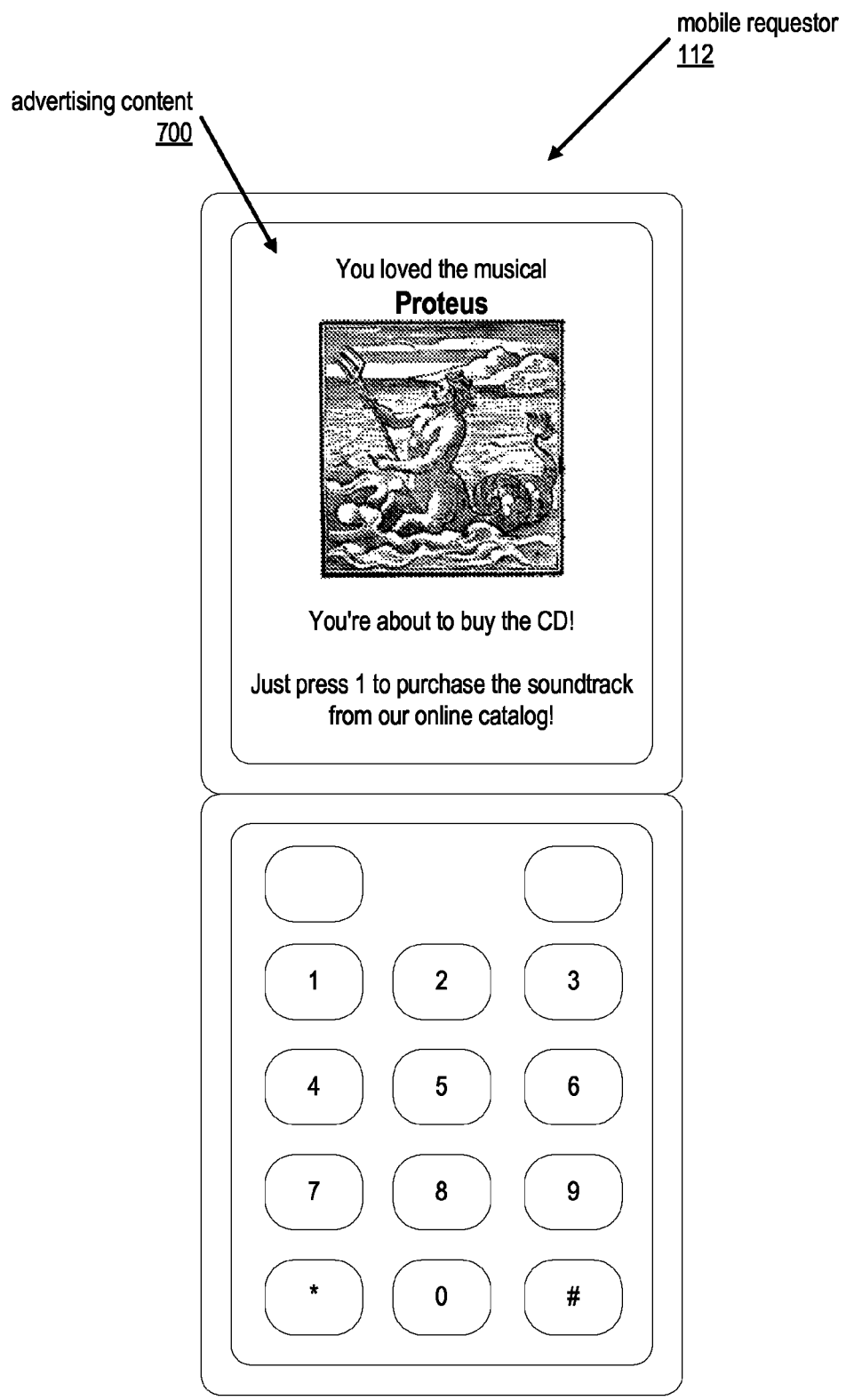
FIG. 7 depicts a block diagram of a mobile device displaying advertising targeted to a user as being appropriate to an expected next behavior on the basis of intent inferred from data a physical movement path, a network navigation path, or an integrated path of the device.

FIG. 7 depicts a block diagram of a mobile device displaying advertising targeted to a user as being appropriate to an expected behavior on the basis of intent inferred from data a physical movement path and a network navigation path of the device. In the example portrayed in FIG. 7, advertising content 700 is displayed on a mobile requestor 112. In advertising content 700, an advertisement for the soundtrack to a hypothetical musical called "Proteus" is shown. In one embodiment, a physical navigation path may indicate that mobile requestor has followed a path commonly followed by buyers of the soundtrack to the Proteus musical. In such an embodiment, a group of path data structures, such as those discussed above with respect to FIGS. 4-5 may contain behaviors that indicate an intent to purchase the soundtrack to the Proteus musical and may have physical paths statistically similar to the path of mobile requestor 112. Examples of such behaviors may be having purchased the Proteus soundtrack CD, having stopped in front of a location where music from the Proteus soundtrack CD is known to be playing, or having sent a search query for information on purchasing the Proteus soundtrack CD.

Likewise, examples of physical navigation paths that commonly followed by purchasers may include walking out of a theatre where Proteus is being shown. In some embodiments, time data included with location data can be mined to infer intent, such as by determining that there is a higher likelihood of intent to purchase the Proteus CD if the user has lingered in the theatre longer than an average user after initial arrival.

In one embodiment, a network navigation path may indicate that mobile requestor has sent content requests commonly sent by buyers of the soundtrack to the Proteus musical. In such an embodiment, a group of path data structures, such as those discussed above with respect to FIGS. 3 and 5 may contain behaviors that indicate an intent to purchase the soundtrack to the Proteus musical and may have content request navigation paths statistically similar to the path of mobile requestor 112. Examples of such behaviors may include having purchased the Proteus soundtrack CD, having visited a seller of online music in response after viewing a review of the musical, or having sent a search request for information on purchasing the soundtracks of "hit musicals."

Likewise, examples of content request navigation paths commonly followed by purchasers may include having visited a seller of online music in response after viewing a review of the musical, or having sent a search request for information on purchasing the soundtracks of "hit musicals."

In one embodiment, a hybrid network navigation and physical navigation path may indicate that mobile requestor has sent content requests commonly sent or visited locations commonly visited by buyers of the soundtrack to the Proteus musical. In such an embodiment, a group of path data structures, such as those discussed above with respect to FIG. 5 may contain behaviors that indicate an intent to purchase the soundtrack to the Proteus musical and may have content request navigation paths statistically similar to the path of mobile requestor 112. Examples of such behaviors may include having purchased the Proteus soundtrack CD, having visited a seller of online music in response after viewing a review of the musical, or having sent a search request for information on purchasing the soundtracks of "hit musicals."

Likewise, examples of physical navigation and content request navigation paths that commonly followed by purchasers may include walking out of a theatre where Proteus is being shown while visiting an online music store. In some embodiments, time data included with location data can be mined to infer intent, such as by determining that there is a higher likelihood of intent to purchase the Proteus CD if the user has lingered longer in the theatre after initial arrival or has visited an online music store while in the theatre or shortly thereafter.

As noted above, the movements of mobile devices and the content navigation of mobile devices may be detected, recorded, tracked and analyzed in order to group paths into intent groupings based on the behavior, and a path consisting of the movements of a mobile device may be compared to the paths associated with the intent groupings to direct advertising content to the mobile device users based on the users' intent. In some embodiments, mobile device users' current and past traffic paths may be analyzed to infer intent. For instance, by analyzing the recent movements of a mobile device user among stores in a shopping mall, it may be determined that visiting a particular store, combination of stores, or combination of stores and websites is associated with the intent for the mobile device user to purchase certain goods. Thus, advertising content for the appropriate to the inferred intent, such as coupons, may be sent to the mobile device user.

Figure 8A:
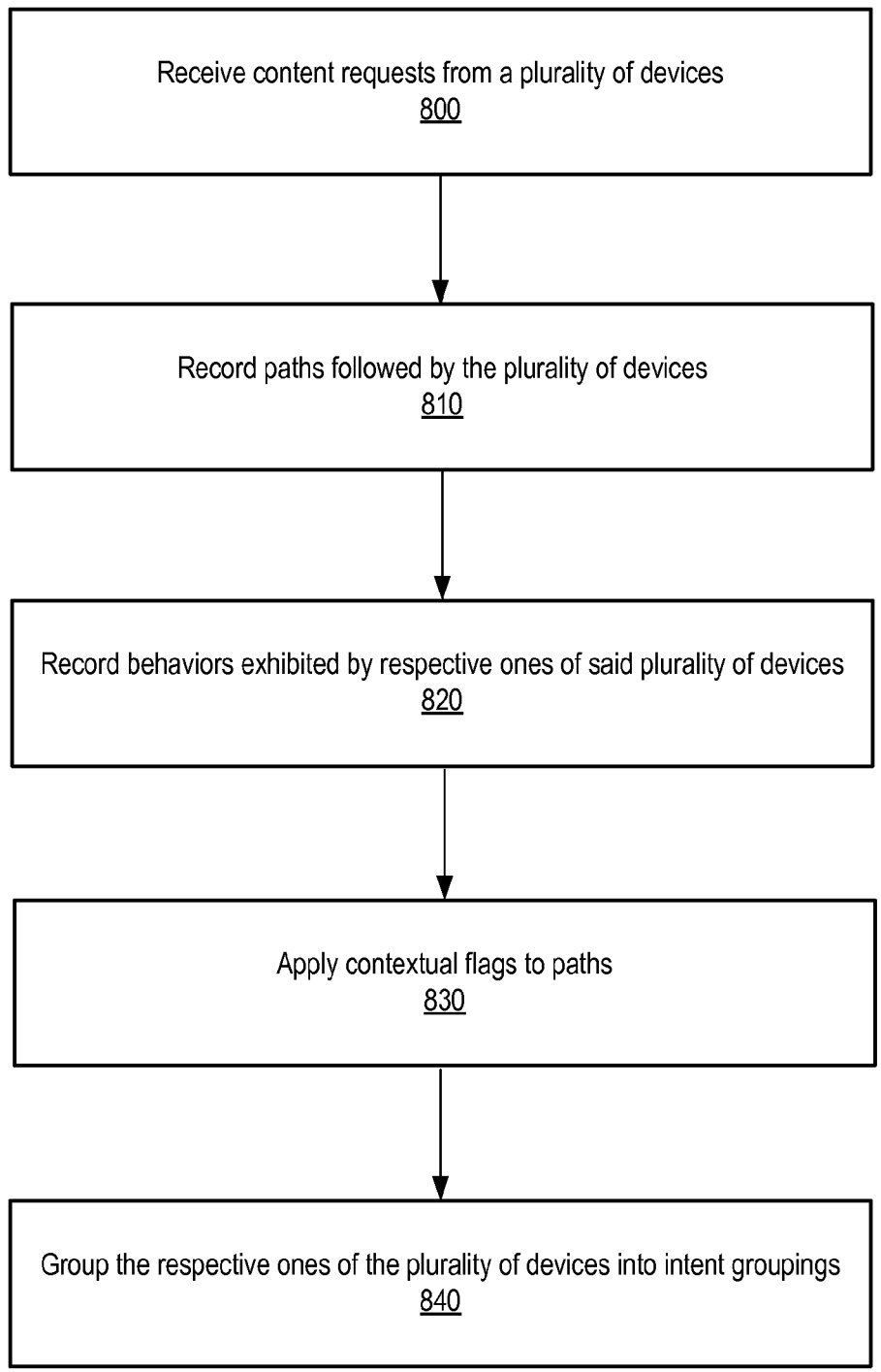
FIG. 8A is a high-level logical flowchart of one embodiment of operations performed in support of grouping users into intent groupings according to one embodiment.

Operations for Inferring User Intent and Providing Content on the Basis of Inferred User Intent FIG. 8A is a high-level logical flowchart of one embodiment of operations performed in support of grouping users into intent groupings according to one embodiment. Content requests are received from a plurality of devices (block 800). In one embodiment, content requests are stored in a navigation paths data store, such as navigation paths data store 200 described above with respect to FIG. 3. Paths followed by the plurality of devices are recorded (block 810). In one embodiment, the paths followed by the devices are grouped into path data structures containing content requests representing the individual steps along the path, such as navigation paths data structures 305a-305n described above with respect to FIG. 3.

Behaviors exhibited by respective ones of the plurality of devices are applied to the paths (block 820). In one embodiment, the behaviors exhibited by the devices are stored into the path data structures containing content requests representing the individual steps along the path followed by the device exhibiting the respective behavior, such as behaviors 315a-315n described above with respect to FIG. 3. Contextual flags are applied to the paths (block 830). Contextual flags are items such as the time decay of a path, which can be used to give less weight to paths over time, such that more recently followed paths influence intent analysis to a greater degree than stale paths. Likewise, as paths are repeated, contextual flags may be applied to increase the relevance of those paths in influencing intent analysis. Contextual flags may be stored in data structures for recording behavior, such as behaviors 315a-315n described above with respect to FIG. 3. Respective ones of the plurality of paths are grouped into intent groupings (block 840), such as intent groupings 240-270 described above with respect to FIG. 2 that are grouped by intent grouping analysis engine 230 of FIG. 2.

Figure 8B:
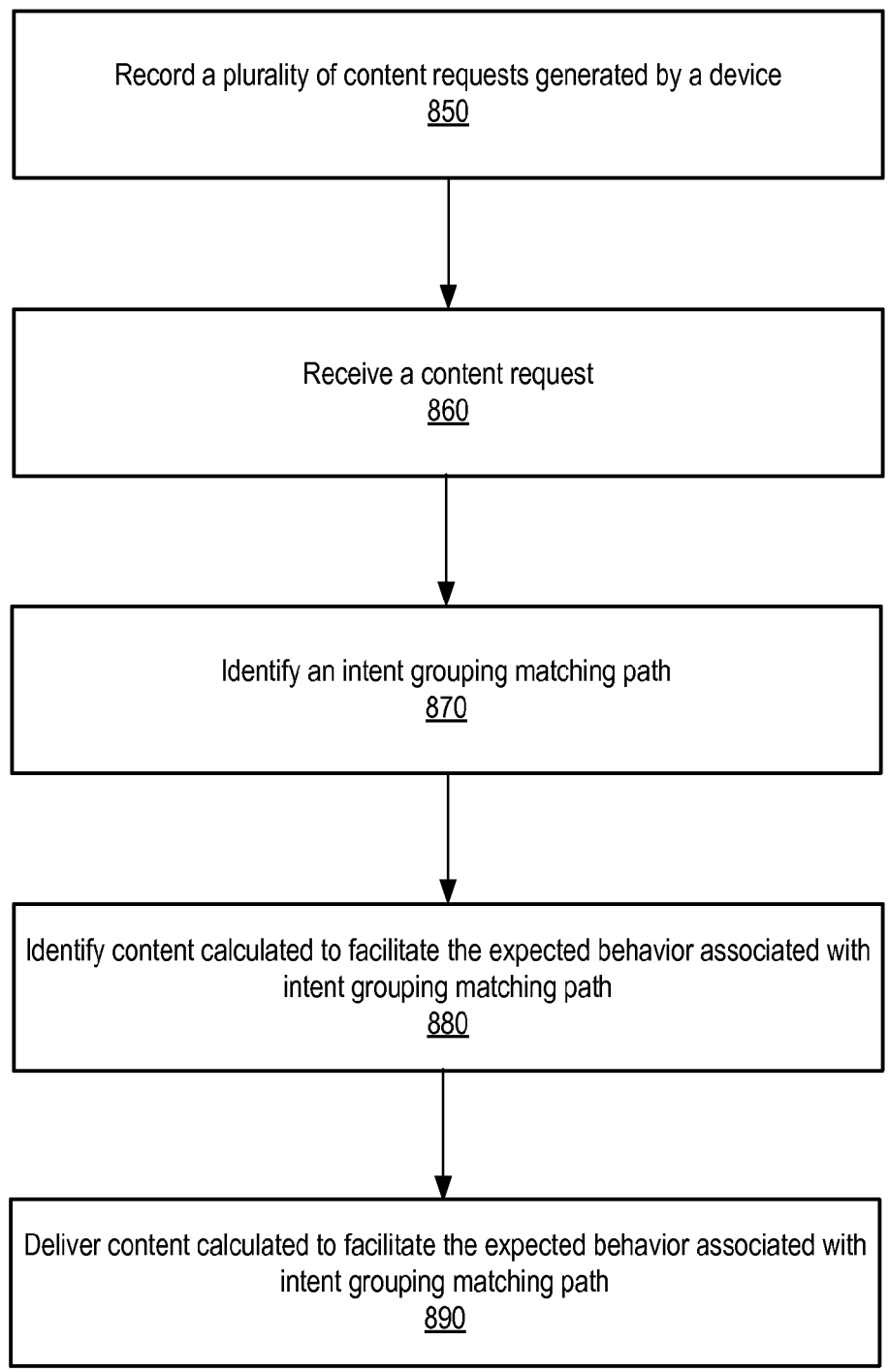
FIG. 8B is a high-level logical flowchart of one embodiment of operations performed in support of inferring intent based on content requests according to one embodiment.

FIG. 8B is a high-level logical flowchart of one embodiment of operations performed in support of inferring intent based on content requests according to one embodiment. A plurality of content requests generated by a device is recorded (block 850). In one embodiment, content requests generated by a device is are recorded in a path of a paths data structure, such as navigation paths data structures 305a-305n described above with respect to FIG. 3. A content request is received (block 860). An intent group matching a path is identified (block 870). In one embodiment, an intent group, also called an intent grouping, matching a path is identified by a traffic analysis engine, such as traffic analysis engine 150 of FIG. 1. Content is identified that is calculated to facilitate expected behavior associated with the intent group matching the path (block 880). In one embodiment, such content is identified by a traffic analysis engine, such as traffic analysis engine 150 of FIG. 1. Alternatively, such content is identified by a host, such as hosts 100 of FIG. 1. Content calculated to facilitate expected behavior associated with the intent group matching the path is delivered (block 890). In one embodiment, such content is delivered by a host, such as hosts 100 using network 120 of FIG. 1.

Figure 9A:
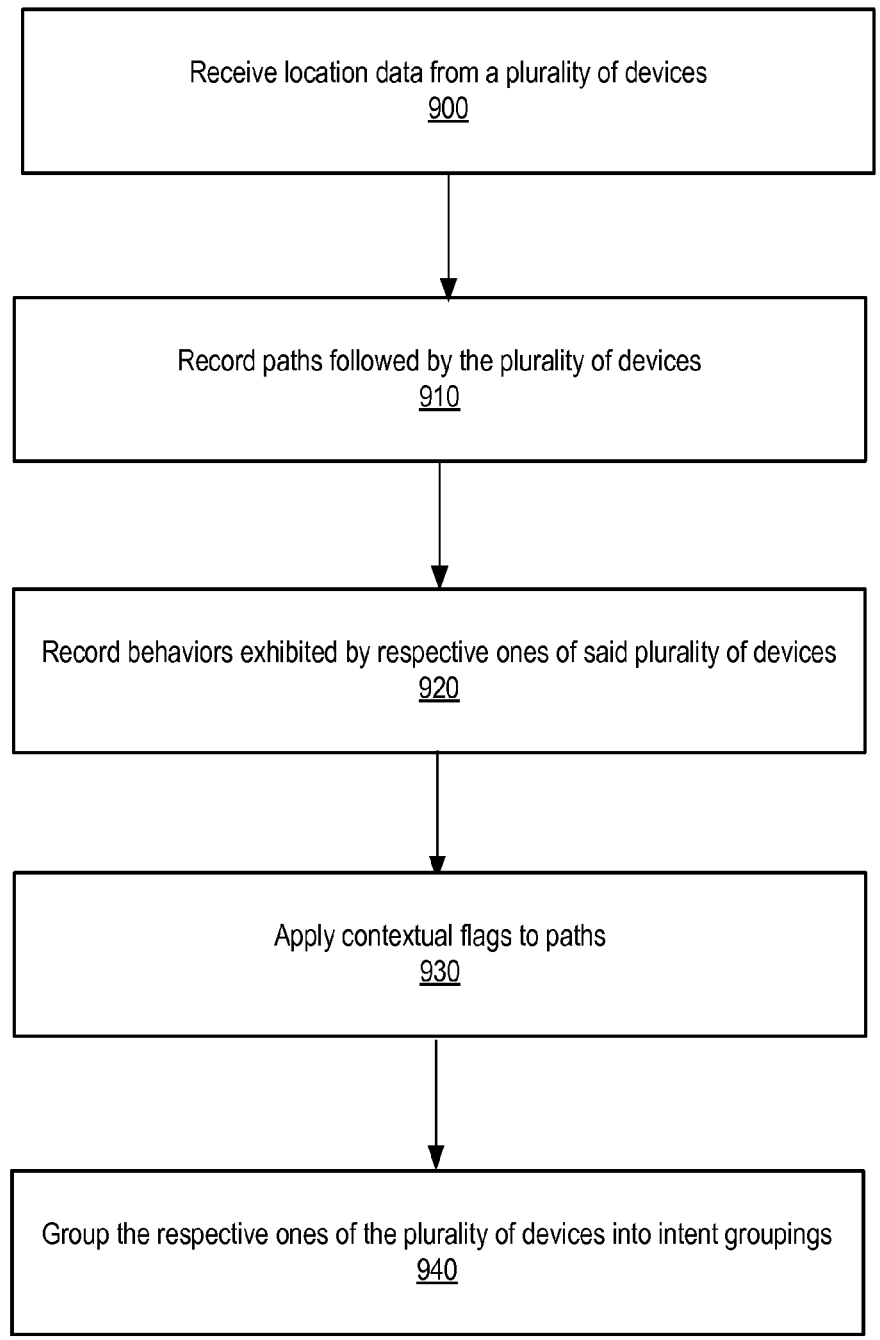
FIG. 9A is a high-level logical flowchart of one embodiment of operations performed in support of grouping users into intent groupings based on physical paths according to one embodiment.

FIG. 9A is a high-level logical flowchart of one embodiment of operations performed in support of grouping users into intent groupings based on physical paths according to one embodiment. Location data is received from a plurality of devices (block 900). In one embodiment, location data is stored in a physical paths data store, such as geographic paths data store 220 described above with respect to FIG. 4. Paths followed by the plurality of devices are recorded (block 910). In one embodiment, the paths followed by the devices are grouped into path data structures containing locations visited by a device along the path, such as paths data structures 405a-405n described above with respect to FIG. 4.

Behaviors exhibited by respective ones of the plurality of devices are applied to the paths (block 920). In one embodiment, the behaviors exhibited by the devices are stored into the path data structures containing locations along the path followed by the device exhibiting the respective behavior, such as behaviors 415a-415n described above with respect to FIG. 4. Contextual flags are applied to the paths (block 430). Contextual flags are items such as the time decay of a path, which can be used to give less weight to paths over time, such that more recently followed paths influence intent analysis to a greater degree than stale paths. Likewise, as paths are repeated, contextual flags may be applied to increase the relevance of those paths in influencing intent analysis. Contextual flags may be stored in data structures for recording behavior, such as behaviors 415a-415n described above with respect to FIG. 4. Respective ones of the plurality of paths are grouped into intent groupings (block 940), such as intent groupings 240-270 described above with respect to FIG. 2 that are grouped by intent grouping analysis engine 230 of FIG. 2.

Figure 9B:
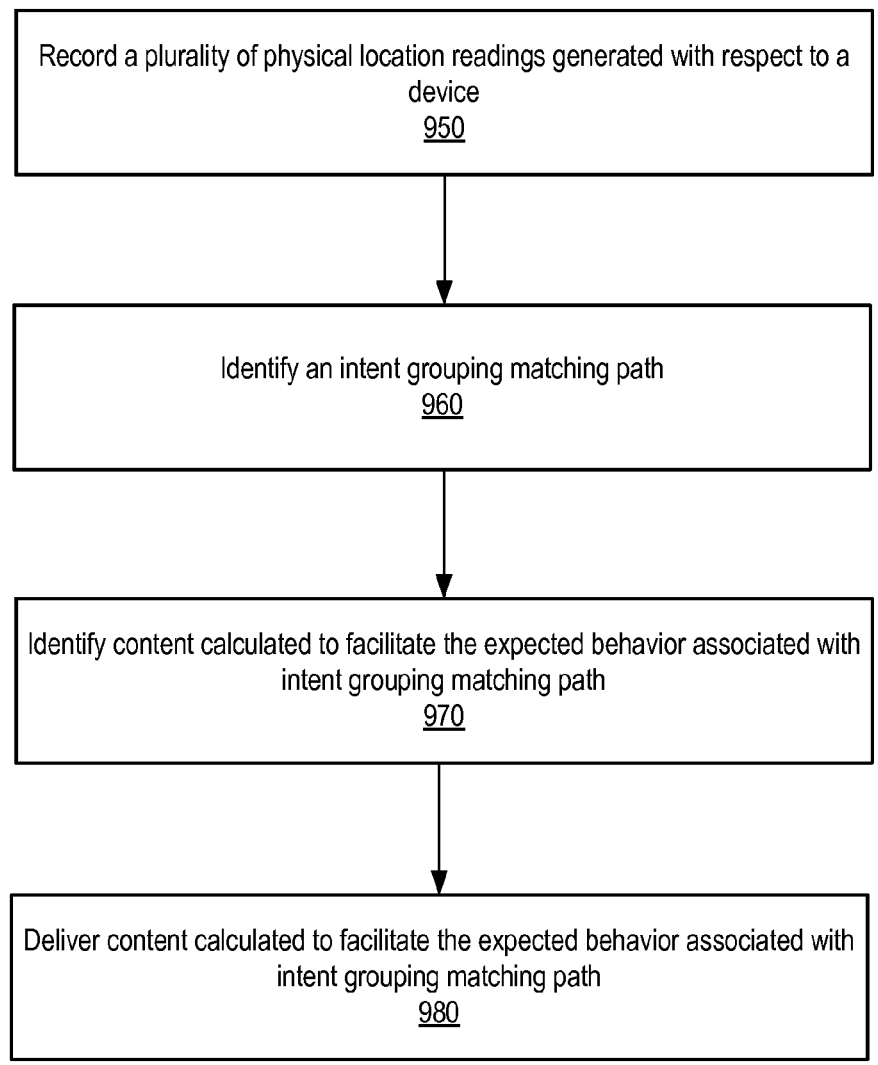
FIG. 9B is a high-level logical flowchart of one embodiment of operations performed in support of inferring intent based on a physical path according to one embodiment.

FIG. 9B is a high-level logical flowchart of one embodiment of operations performed in support of inferring intent based on a physical path according to one embodiment. A plurality of physical location readings generated by a device is recorded (block 950). In one embodiment, physical location readings generated by a device are recorded in a path of a paths data structure, such as path data structures 405a-405n described above with respect to FIG. 4. An intent group matching a path is identified (block 860). In one embodiment, an intent group, also called an intent grouping, matching a path is identified by a traffic analysis engine, such as traffic analysis engine 150 of FIG. 1. Content is identified that is calculated to facilitate expected behavior associated with the intent group matching the path (block 980). In one embodiment, such content is identified by a traffic analysis engine, such as traffic analysis engine 150 of FIG. 1. Alternatively, such content is identified by a host, such as hosts 100 of FIG. 1. Content calculated to facilitate expected behavior associated with the intent group matching the path is delivered (block 990). In one embodiment, such content is delivered by a host, such as hosts 100 using network 120 of FIG. 1.

Figure 10A:
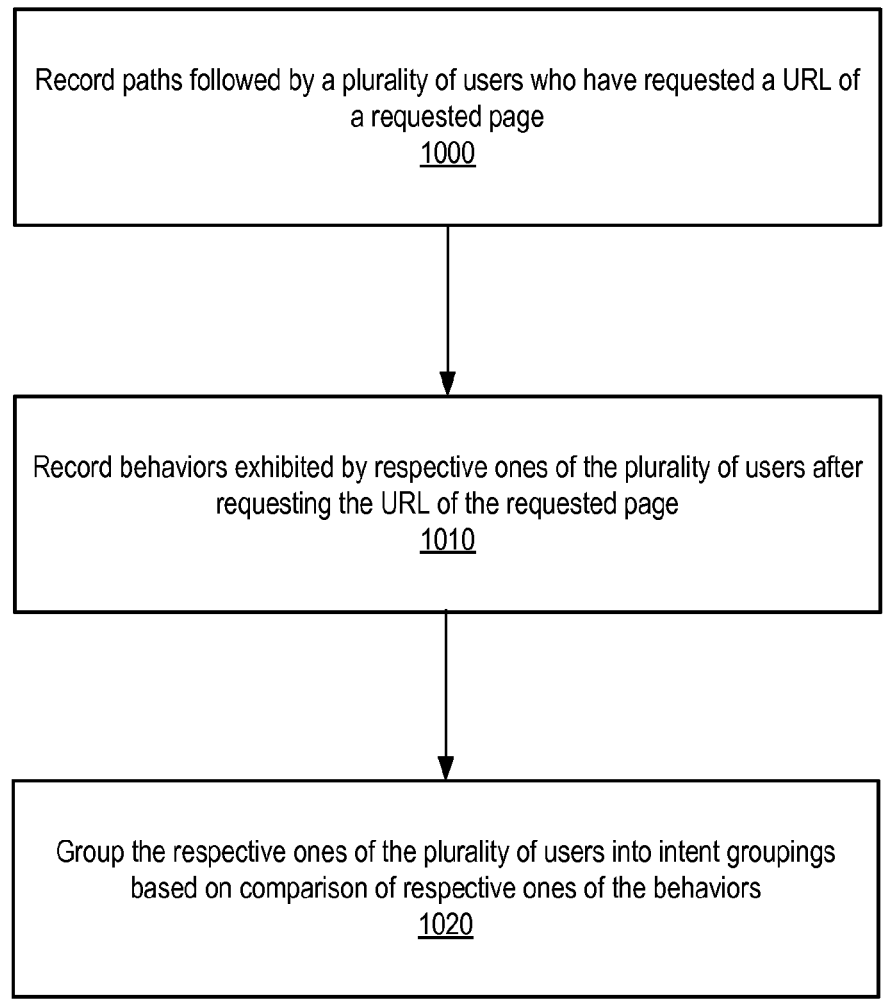
FIG. 10A is a high-level logical flowchart of one embodiment of operations performed in support of grouping users into intent groupings based on content requests according to one embodiment.

FIG. 10A is a high-level logical flowchart of one embodiment of operations performed in support of grouping users into intent groupings based on content requests according to one embodiment. Paths followed by a plurality of users who have requested a URL of a requested page are recorded (block 1000). Behaviors exhibited by respective ones of the plurality of users after requesting the URL of the requested page are recorded (block 1010). The respective ones of the plurality of users are grouped into intent groupings based on comparison of respective ones of the behaviors (block 1020).

Figure 10B:
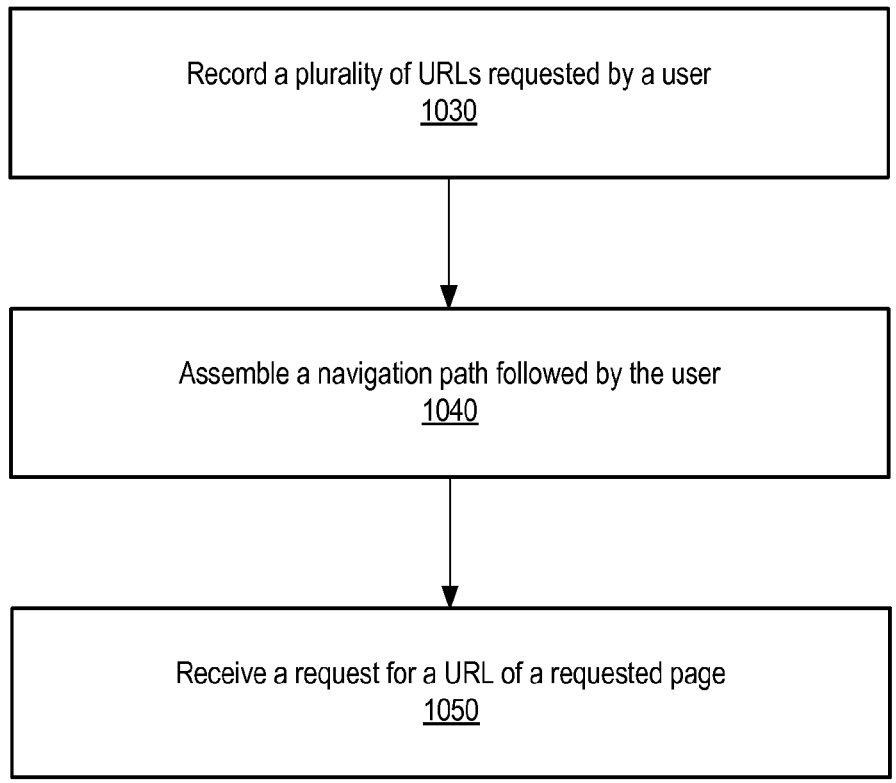
FIG. 10B is a high-level logical flowchart of one embodiment of operations performed in support of assembling a network navigation path based on content requests according to one embodiment.

FIG. 10B is a high-level logical flowchart of one embodiment of operations performed in support of assembling a network navigation path based on content requests according to one embodiment. A plurality of URLs requested by a user is recorded (block 1030). A navigation path followed by the user is assembled (block 1040). A request for a URL of a requested page is received (block 1050).

Figure 10C:
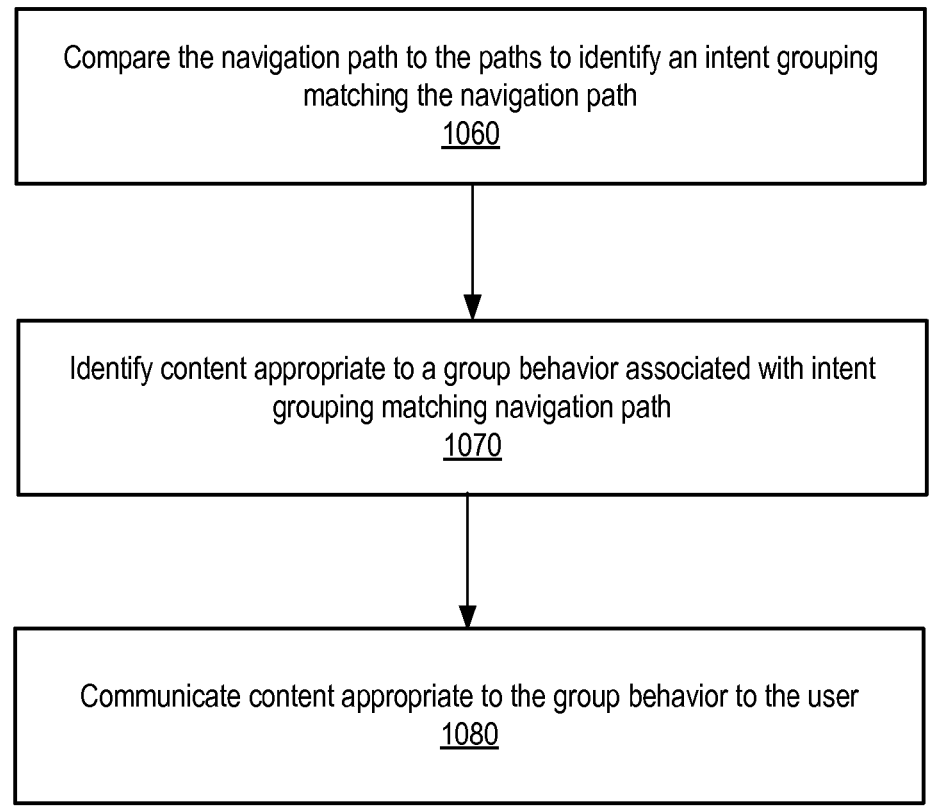
FIG. 10C is a high-level logical flowchart of one embodiment of operations performed in support of inferring intent based on content requests according to one embodiment.

FIG. 10C is a high-level logical flowchart of one embodiment of operations performed in support of inferring intent based on content requests according to one embodiment. The navigation path is compared to paths to identify an intent grouping matching the navigation path (block 1060). Content appropriate to an expected group behavior associated with an intent grouping matching the navigation path is identified (block 1070). Content appropriate to an expected group behavior associated with an intent grouping matching the navigation path is communicated to the user (block 1080).

Figure 11A:
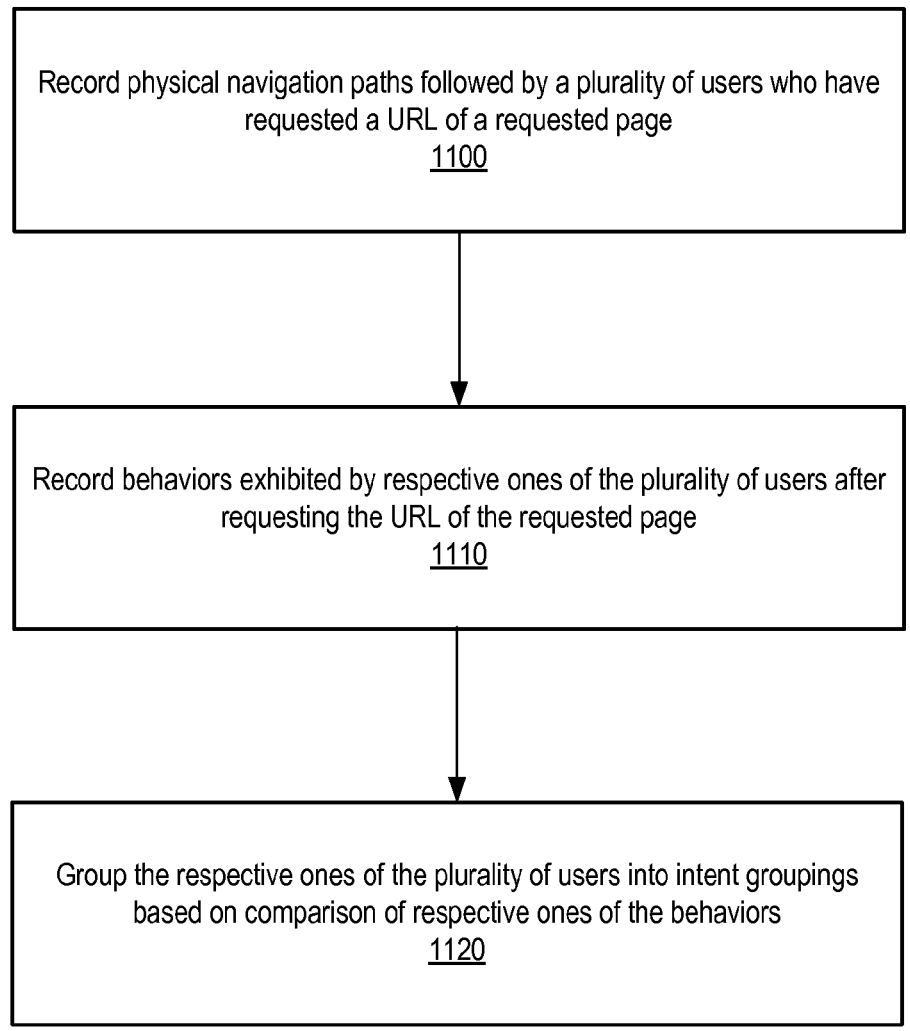
FIG. 11A is a high-level logical flowchart of one embodiment of operations performed in support of grouping users into intent groupings based on physical paths according to one embodiment.

FIG. 11A is a high-level logical flowchart of one embodiment of operations performed in support of grouping users into intent groupings based on physical paths according to one embodiment. Physical navigation paths followed by a plurality of users who have requested a URL of a requested page are recorded (block 1100). Behaviors exhibited by respective ones of the plurality of users after requesting the URL of the requested page are recorded (block 1110). The respective ones of the plurality of users are grouped into intent groupings based on comparison of respective ones of the behaviors (block 1120).

Figure 11B:
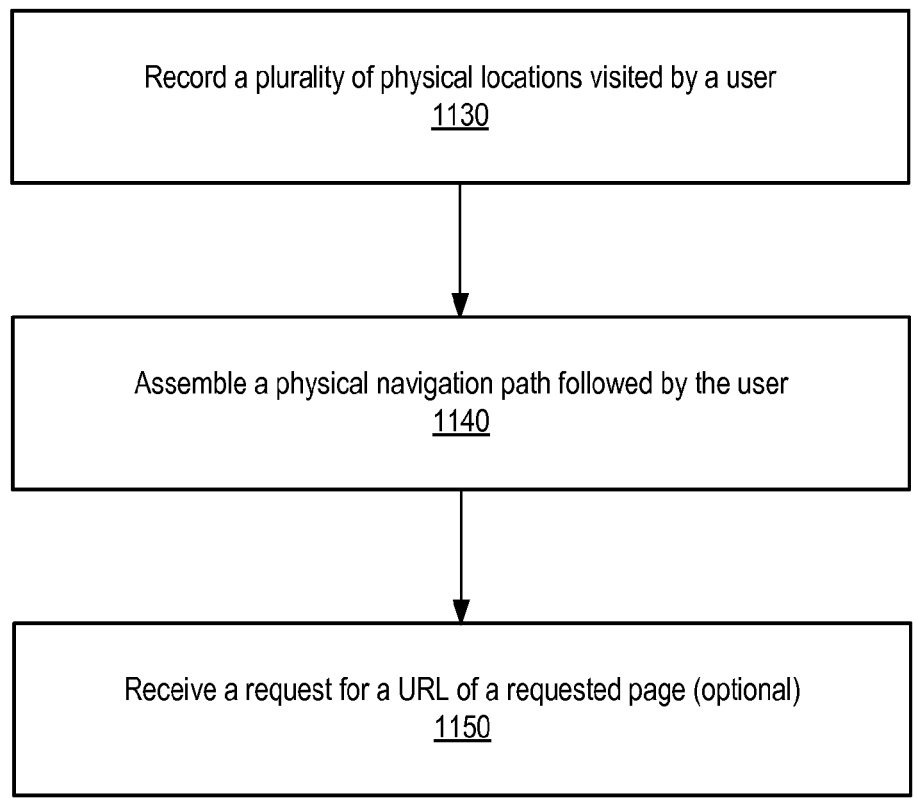
FIG. 11B is a high-level logical flowchart of one embodiment of operations performed in support of assembling a physical navigation path based on location information according to one embodiment.

FIG. 11B is a high-level logical flowchart of one embodiment of operations performed in support of assembling a physical navigation path based on location information according to one embodiment. A plurality of physical locations visited by a user is recorded (block 1130). A navigation path followed by the user is assembled (block 1140). A request for a URL of a requested page is received (block 1150).

Figure 11C:
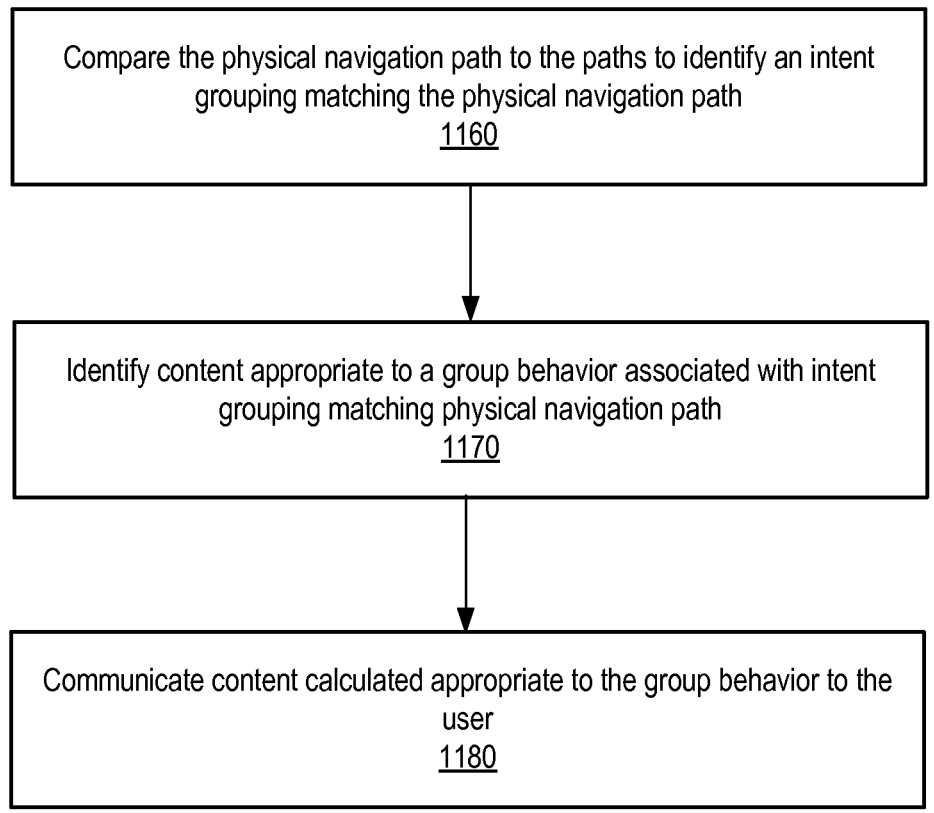
FIG. 11C is a high-level logical flowchart of one embodiment of operations performed in support of inferring intent based on a physical path according to one embodiment.

FIG. 11C is a high-level logical flowchart of one embodiment of operations performed in support of inferring intent based on a physical path according to one embodiment. The physical navigation path is compared to paths to identify an intent grouping matching the navigation path (block 1160). Content appropriate to an expected group behavior associated with an intent grouping matching the navigation path is identified (block 1170). Content appropriate to an expected group behavior associated with an intent grouping matching the navigation path is communicated to the user (block 1180).

Figure 12A:
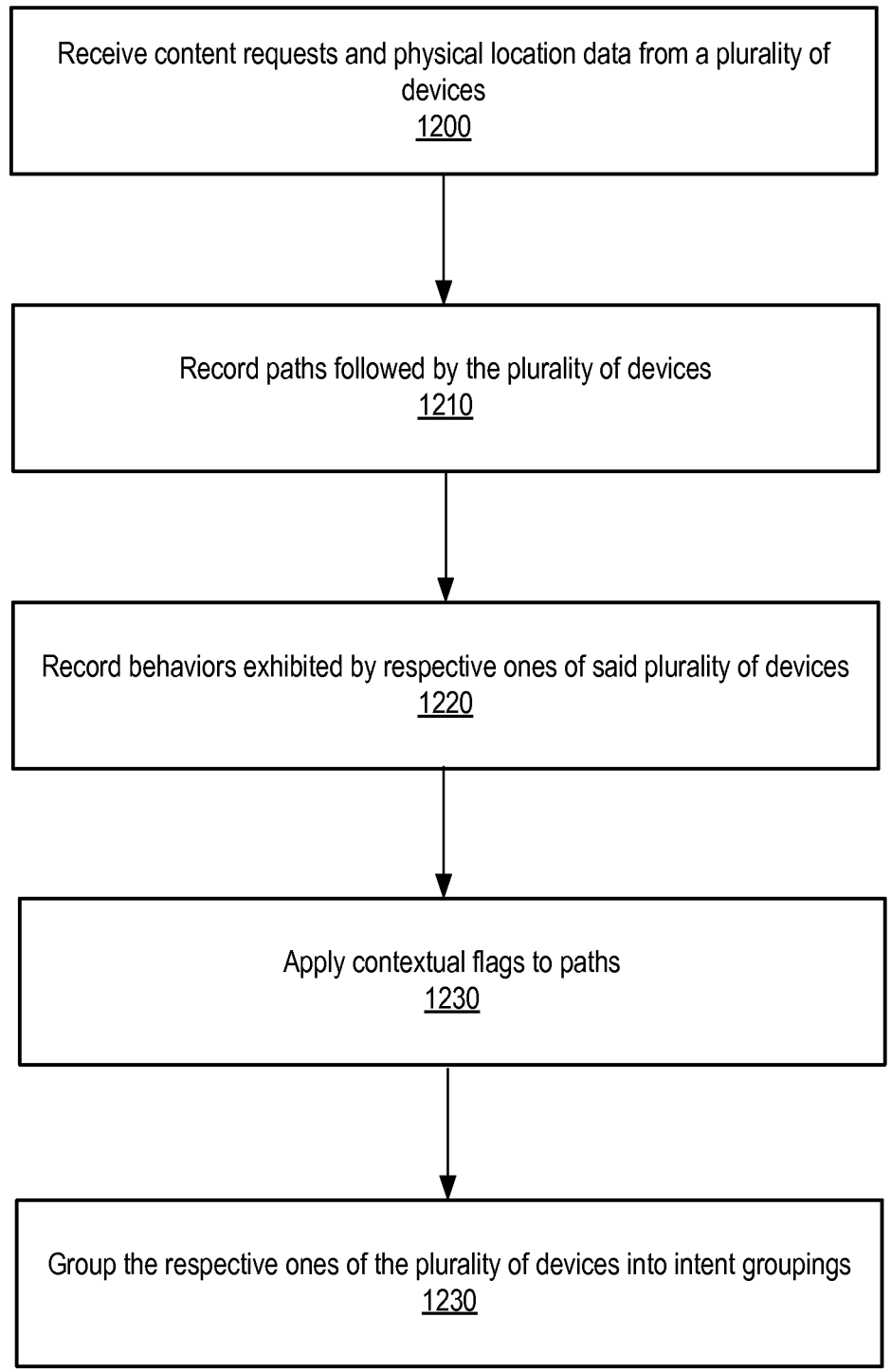
FIG. 12A is a high-level logical flowchart of one embodiment of operations performed in support of grouping users into intent groupings based on physical paths and network navigation paths according to one embodiment.

FIG. 12A is a high-level logical flowchart of one embodiment of operations performed in support of grouping users into intent groupings based on physical paths and network navigation paths according to one embodiment. Content requests and physical location data are received from a plurality of devices (block 1200). In one embodiment, content requests and physical location data are stored in a navigation paths data store, such as integrated paths data store 210 described above with respect to FIG. 5. Paths followed by the plurality of devices are recorded (block 1210). In one embodiment, the paths followed by the devices are grouped into path data structures containing content requests and physical location readings representing the individual steps along the path, such as navigation paths data structures 505a-505n described above with respect to FIG. 5.

Behaviors exhibited by respective ones of the plurality of devices are applied to the paths (block 1220). In one embodiment, the behaviors exhibited by the devices are stored into the path data structures containing content requests physical location readings representing the individual steps along the path followed by the device exhibiting the respective behavior, such as behaviors 515a-515n described above with respect to FIG. 5. Contextual flags are applied to the paths (block 1230). Contextual flags are items such as the time decay of a path, which can be used to give less weight to paths over time, such that more recently followed paths influence intent analysis to a greater degree than stale paths. Likewise, as paths are repeated, contextual flags may be applied to increase the relevance of those paths in influencing intent analysis. Contextual flags may be stored in data structures for recording behavior, such as behaviors 515a-515n described above with respect to FIG. 5. Respective ones of the plurality of paths are grouped into intent groupings (block 1240), such as intent groupings 240-270 described above with respect to FIG. 2 that are grouped by intent grouping analysis engine 230 of FIG. 2.

Figure 12B:
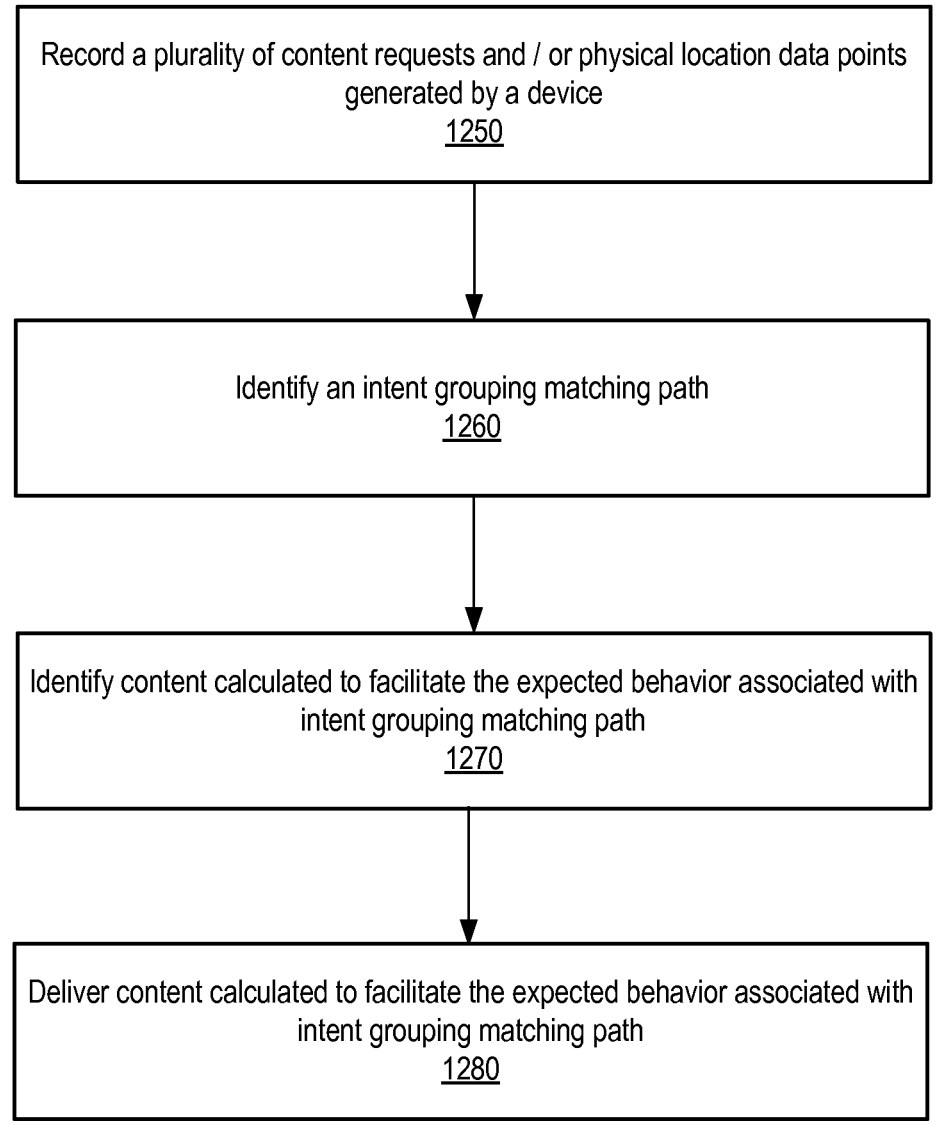
FIG. 12B is a high-level logical flowchart of one embodiment of operations performed in support of inferring intent based on an integrated physical and network navigation path according to one embodiment.

FIG. 12B is a high-level logical flowchart of one embodiment of operations performed in support of inferring intent based on an integrated physical and network navigation path according to one embodiment. A plurality of content requests and physical location data points generated by a device is recorded (block 1250). In one embodiment, content requests generated by a device is are recorded in a path of a paths data structure, such as path data structures 505a-505n described above with respect to FIG. 5. An intent group matching a path is identified (block 1260). In one embodiment, an intent group, also called an intent grouping, matching a path is identified by a traffic analysis engine, such as traffic analysis engine 150 of FIG. 1. Content is identified that is calculated to facilitate expected behavior associated with the intent group matching the path (block 1270). In one embodiment, such content is identified by a traffic analysis engine, such as traffic analysis engine 150 of FIG. 1. Alternatively, such content is identified by a host, such as hosts 100 of FIG. 1. Content calculated to facilitate expected behavior associated with the intent group matching the path is delivered (block 1280). In one embodiment, such content is delivered by a host, such as hosts 100 using network 120 of FIG. 1.

Figure 13:
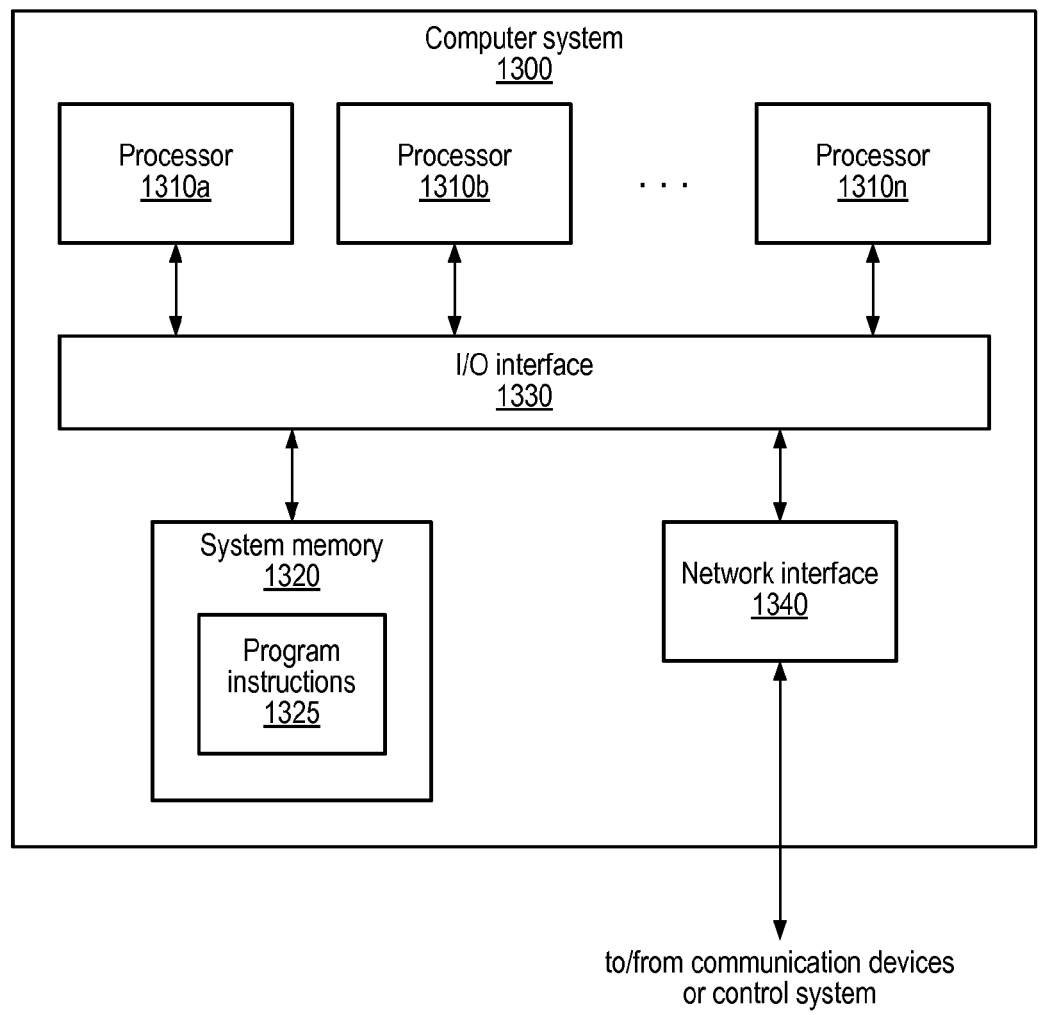
FIG. 13 is a block diagram illustrating an embodiment of a computer system, such as traffic pattern analysis system, usable to utilize navigational paths and/or user trails for directing advertising content to mobile device users, as described herein.

Example Computing Systems for Inferring User Intent and Providing Content on the Basis of Inferred User Intent FIG. 13 is a block diagram illustrating an embodiment of a computer system, such as intent analysis system 130, usable to utilize navigational paths and/or user trails for directing advertising content to mobile device users, as described herein, such as intent analysis system 130, usable to utilize navigational paths and/or user trails for directing advertising content to mobile device users, as described herein. In one embodiment, intent analysis system 130, illustrated in FIG. 1, may include a general-purpose computer system that includes or is configured to access one or more computer-accessible media, such as computer system 1300 illustrated in FIG. 13.

In the illustrated embodiment, computer system 1300 includes one or more processors 1310 coupled to a system memory 1320 via an input/output (I/O) interface 1330. Computer system 1300 further includes a network interface 1340 coupled to I/O interface 1330. In some embodiments, computer system 1300 may be illustrative of intent analysis system 130, while in other embodiments intent analysis system 130 may include elements in addition to those illustrated in computer system 1300.

In various embodiments, computer system 1300 may be a uniprocessor system including one processor 1310, or a multiprocessor system including several processors 1310 (e.g., two, four, eight, or another suitable number). Processors 1310 may be any suitable processors capable of executing instructions. For example, in various embodiments, processors 1310 may be general-purpose or embedded processors implementing any of a variety of instruction set architectures (ISAs), such as the x86, PowerPC, SPARC, or MIPS ISAs, or any other suitable ISA. In multiprocessor systems, each of processors 1310 may commonly, but not necessarily, implement the same ISA.

System memory 1320 may be configured to store instructions and data accessible by processor 1310. In various embodiments, system memory 1320 may be implemented using any suitable memory technology, such as static random access memory (SRAM), synchronous dynamic RAM (SDRAM), non-volatile/Flash-type memory, or any other type of memory. In the illustrated embodiment, program instructions and data implementing desired functions, such as those methods and techniques described above for hosts 100, intent analysis system 130, requestors 110, mobile requestors 112, and/or mobile service provider 195 are shown stored within system memory 1320 as code 1325.

In one embodiment, I/O interface 1330 may be configured to coordinate I/O traffic between processor 1310, system memory 1320 and any peripheral devices in the device, including network interface 1340 or other peripheral interfaces. In some embodiments, I/O interface 1330 may perform any necessary protocol, timing or other data transformations to convert data signals from one component (e.g., system memory 1320) into a format suitable for use by another component (e.g., processor 1310). In some embodiments, I/O interface 1330 may include support for devices attached through various types of peripheral buses, such as a variant of the Peripheral Component Interconnect (PCI) bus standard or the Universal Serial Bus (USB) standard, for example. In some embodiments, the function of I/O interface 1330 may be split into two or more separate components, such as a north bridge and a south bridge, for example. Also, in some embodiments, some or all of the functionality of I/O interface 1330, such as an interface to system memory 1320, may be incorporated directly into processor 1310.

Network interface 1340 may be configured to allow data to be exchanged between computer system 1300 and other devices attached to a network, such as other computer systems, for example. In particular, network interface 1340 may be configured to allow communication between computer system 1300 and other computer system described above. Network interface 1340 may commonly support one or more wireless networking protocols (e.g., Wi-Fi/IEEE 802.11, or another wireless networking standard). However, in various embodiments, network interface 1340 may support communication via any suitable wired or wireless general data networks, such as other types of Ethernet networks, for example. Additionally, network interface 1340 may support communication via telecommunications/telephony networks such as analog voice networks or digital fiber communications networks, via storage area networks such as Fibre Channel SANs, or via any other suitable type of network and/or protocol.

In some embodiments, system memory 1320 may be one embodiment of a computer-accessible medium configured to store program instructions and data as described above. However, in other embodiments, program instructions and/or data may be received, sent or stored upon different types of computer-accessible media. Generally speaking, a computer-accessible medium may include storage media or memory media such as magnetic or optical media, e.g., disk or DVD/CD coupled to computer system 1300 via I/O interface 1330. A computer-accessible medium may also include any volatile or non-volatile media such as RAM (e.g. SDRAM, DDR SDRAM, RDRAM, SRAM, etc.), ROM, etc, that may be included in some embodiments of computer system 1300 as system memory 1320 or another type of memory. Further, a computer-accessible medium may include transmission media or signals such as electrical, electromagnetic, or digital signals, conveyed via a communication medium such as a network and/or a wireless link, such as may be implemented via network interface 1340.

Various embodiments may further include receiving, sending or storing instructions and/or data implemented in accordance with the foregoing description upon a computer-readable, storage medium. Generally speaking, a computer-readable, storage medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc.

The various methods as illustrated in the figures and described herein represent exemplary embodiments of methods. The methods may be implemented manually, in software, in hardware, or in a combination thereof. The order of any method may be changed, and various elements may be added, reordered, combined, omitted, modified, etc. Various modifications and changes may be made as would be obvious to a person skilled in the art having the benefit of this disclosure. It is intended that the invention embrace all such modifications and changes and, accordingly, the above description to be regarded in an illustrative rather than a restrictive sense.

What is claimed is:

1. A system, comprising:
one or more computers configured to implement a transaction-related communication system, wherein the transaction-related communication system comprises:
a network navigation monitoring module configured to assemble a current navigation path followed by a particular user, wherein
the current navigation path comprises a description of a series of URLs requested by the particular user prior to requesting a URL of a current requested page and forming a navigation path leading the particular user to the current requested page;
an intent database configured to
record network navigation paths followed by a plurality of other users who have requested the URL of the same requested page requested by the particular user, wherein
the navigation paths comprise descriptions of respective pluralities of URLs forming navigation paths leading the respective users to the same requested page requested by the particular user,
record behaviors exhibited by respective ones of the plurality of users after requesting the URL of the requested page, and
group the respective ones of the plurality of users into intent groupings based on comparison of respective ones of the behaviors, wherein
the respective ones of the behaviors comprise requests for content; and
a content delivery module configured to
perform a comparison of the current navigation path of the particular user to the navigation paths followed by the other users to the same requested page,
based on the comparison, identify an intent grouping having navigation paths within a degree of similarity to the current navigation path for the particular user,
identify content appropriate to a group behavior associated with the intent grouping, and
communicate the content appropriate to the group behavior to the user.

2. The system of claim 1, wherein the content delivery module is further configured to insert the content into a portion of the requested page.

3. The system of claim 1, wherein the requests for content further comprise requests for electronic commerce transactions.

4. The system of claim 1, wherein the content delivery module is further configured to communicate the content in place of the requested page.

5. The system of claim 1, wherein
the navigation path further comprises a plurality of spatial locations visited by the user prior to requesting a URL of a requested page; and
the paths followed by the plurality of users who have requested the URL of the requested page further comprise a plurality of spatial locations visited by the plurality of users who have requested the URL of the requested page.

6. A computer-implemented method, comprising:
recording navigation paths followed by a plurality of devices, wherein
devices of the plurality have sent content requests similar to a current content request from a particular device, and
the navigation paths comprise descriptions of respective pluralities of content requests forming navigation paths leading the respective devices to same requested content requested by the particular device;
recording behaviors exhibited by respective ones of the plurality of devices after sending the content requests;
grouping the respective ones of the plurality of devices into intent groupings, wherein
the grouping the respective ones of the plurality of devices into intent groupings further comprises grouping the respective ones of the plurality of devices into intent groupings based at least in part on comparison of respective ones of the behaviors;
assembling a current navigation path followed by the particular device, wherein
the assembling the current navigation path comprises recording a plurality description of a series of content requests generated by the particular device prior to the current content request and forming a navigation path leading the particular device to the current content request;
identifying an intent grouping matching the current navigation path, each intent grouping is associated with an expected behavior, and
the identifying comprises performing a comparison of the current navigation path to the navigation paths followed by the respective devices to the same requested content requested by the particular device to identify an intent grouping having navigation paths within a degree of similarity to the current navigation path for the particular device; and
identifying content calculated to facilitate the expected behavior.

7. The computer-implemented method of claim 6, wherein the grouping the respective ones of the plurality of devices into the intent groupings further comprises grouping the respective ones of the plurality of devices into the intent groupings based on a statistical measure of path similarity.

8. The computer-implemented method of claim 7, wherein the grouping the respective ones of the plurality of devices into the intent groupings based on a statistical measure of path similarity further comprises grouping the respective ones of the plurality of devices into the intent groupings based on an analysis of content similarity of sites in the paths.

9. The computer-implemented method of claim 7, wherein the grouping the respective ones of the plurality of devices into the intent groupings based on a statistical measure of path similarity further comprises grouping the respective ones of the plurality of devices into the intent groupings based on an analysis of common sites in the paths.

10. The computer-implemented method of claim 7, wherein the grouping the respective ones of the plurality of devices into the intent groupings based on a statistical measure of path similarity further comprises grouping the respective ones of the plurality of devices into the intent groupings based on an analysis of similarity of search queries in the paths.

11. The computer-implemented method of claim 7, wherein the grouping the respective ones of the plurality of devices into the intent groupings based on a statistical measure of path similarity further comprises grouping the respective ones of the plurality of devices into the intent groupings based on an analysis of similarity of timestamps in the paths.

12. The computer-implemented method of claim 6, wherein the grouping the respective ones of the plurality of devices into the intent groupings further comprises grouping the respective ones of the plurality of devices into the intent groupings based on comparison of respective ones of the behaviors.

13. The computer-implemented method of claim 12, wherein the respective ones of the behaviors comprise requests for content.

14. A non-transitory computer-readable storage medium storing program instructions that when executed cause a server to implement a content selection system, wherein the content selection system comprises:
a path recording function for
assembling a current navigation path followed by a particular device, wherein
the current navigation path comprises a description of a series of network locations requested by the particular device prior to a current content request and forming a navigation path leading the particular device to the current content request, and
recording network navigation paths followed by a plurality of other devices that have sent content requests similar to the current content request from the particular device, wherein
the network navigation paths comprise descriptions of respective pluralities of network locations forming navigation paths leading the respective other devices to a same network location as for the current content request by the particular device;
a behavior recording function recording behaviors exhibited by respective ones of the plurality of other devices after sending the content requests similar to the current content request;
a grouping function for grouping the respective ones of the plurality of other devices into intent groupings, wherein
the grouping the respective ones of the plurality of other devices into intent groupings further comprises
grouping the respective ones of the plurality of other devices into intent groupings based at least in part on comparison of respective ones of the behaviors;
an intent group identification function for identifying an intent grouping having navigation paths statistically similar to the current navigation path for the particular device; and
a content identification function for identifying content appropriate to a group behavior associated with the intent grouping.

15. The non-transitory computer-readable storage medium of claim 14, wherein the content selection system further comprises a transaction information communication function for communicating the content to the device.

16. The non-transitory computer-readable storage medium of claim 14, wherein the content identification function further comprises a recommendation generation engine for recommending products for purchase by a user of the device.

17. The non-transitory computer-readable storage medium of claim 14, wherein the content identification function further comprises a content ordering function for placing items of content for display in an order reflecting a measure of appropriateness to the group behavior associated with the intent grouping.

18. The non-transitory computer-readable storage medium of claim 14, wherein the content selection system further comprises a paths reporting function for reporting sites visited by respective ones of the plurality of devices.

19. The non-transitory computer-readable storage medium of claim 14, wherein the path recording function comprises a path monitor for recording sites visited by the device.

20. The non-transitory computer-readable storage medium of claim 19, wherein the path recording function comprises an integration function for reporting sites visited by the device in the current content request.

21. A system, comprising:
one or more computers configured to implement a content-selection system, wherein the content selection system comprises:
an intent database configured to
record network navigation paths followed by a plurality of users who have requested content similar to content that is specified in a current content request from a particular user, wherein
the network navigation paths comprise descriptions of respective pluralities of network locations forming navigation paths leading the respective users to a same network location as for the current content request by the particular user, and
record behaviors exhibited by respective ones of the plurality of users after requesting the content similar to content that is specified in a current content request, and
group the respective ones of the plurality of users into intent groupings based on comparison of respective ones of the behaviors; and
a content identification module configured to
perform a comparison of the current navigation path of the particular user to the network navigation paths to identify an intent grouping matching the current navigation path, wherein
the current navigation path comprises a description of a series of network locations requested by the particular user prior to the current content request and forming a navigation path leading the particular user to the current content request, and
identify content appropriate to a group behavior associated with the intent grouping.

22. The system of claim 21, wherein the paths are compared to the path using a calculation giving greater weight to more recent ones of the paths.

23. The system of claim 21, wherein the paths are compared to the path using a calculation giving greater weight to ones of the paths that are repeated.

24. The system of claim 21, wherein the paths are compared to the path using a calculation giving less weight to ones of the paths for which the group behavior failed to predict behavior of a previous device.

25. The system of claim 21, wherein the path comprises a series of physical locations visited by the device and the paths comprise physical locations visited by respective ones of the plurality of users.

* * * * *

UNITED STATES PATENT AND TRADEMARK OFFICE
CERTIFICATE OF CORRECTION

| | | |
|---|---|---|
| PATENT NO. | : 8,775,275 B1 | Page 1 of 1 |
| APPLICATION NO. | : 13/076237 | |
| DATED | : July 8, 2014 | |
| INVENTOR(S) | : Elmore Eugene Pope | |

It is certified that error appears in the above-identified patent and that said Letters Patent is hereby corrected as shown below:

In The Claims:

Claim 6, column 22, line 23, after "recording a", please remove "plurality".

Claim 6, column 22, line 29, after "path,", please insert --wherein--.

Signed and Sealed this
Thirtieth Day of September, 2014

Michelle K. Lee
*Deputy Director of the United States Patent and Trademark Office*